United States Patent

(12) United States Patent
Takahashi

(10) Patent No.: US 12,593,187 B2
(45) Date of Patent: Mar. 31, 2026

(54) MEASUREMENT SYSTEM AND MEASUREMENT METHOD

(71) Applicant: Panasonic Intellectual Property Management Co., Ltd., Osaka (JP)

(72) Inventor: Takeshi Takahashi, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 161 days.

(21) Appl. No.: 18/755,423

(22) Filed: Jun. 26, 2024

(65) Prior Publication Data

US 2025/0008283 A1 Jan. 2, 2025

(30) Foreign Application Priority Data

Jun. 30, 2023 (JP) ................................ 2023-108871

(51) Int. Cl.
*H04R 29/00* (2006.01)
*H04R 1/10* (2026.01)

(52) U.S. Cl.
CPC ......... *H04R 29/001* (2013.01); *H04R 1/1016* (2013.01)

(58) Field of Classification Search
None
See application file for complete search history.

(56) References Cited

U.S. PATENT DOCUMENTS

2021/0014613 A1* 1/2021 Carrigan ................. G06F 3/165
2023/0254629 A1* 8/2023 Ishibashi .............. H04R 1/1058 381/71.6

OTHER PUBLICATIONS

Extended European Search Report, dated Nov. 29, 2024, for European Patent 1 Application No. 24185282.1. (7 pages).
Sony Corporation, "WF-1000XM4 Wireless Noise Cancelling Headphones", [online], URL:https://www.sony.com/en-sa/electronics/truly-wireless/wf-1000xm4#made-to-fit-you, 2023, 5 pages.

* cited by examiner

*Primary Examiner* — Yosef K Laekemariam
(74) *Attorney, Agent, or Firm* — Seed Group LLP

(57) ABSTRACT

A measurement system includes two earphones in which a plurality of earpieces having different sizes are replaceably attached, and a wireless terminal carried by the user. The measurement system executes a measurement process at least once on whether the currently worn earpiece is sealed in an ear of the user. The wireless terminal receives an input operation related to a wearing feeling of the currently worn earpiece worn in the ear of the user, and displays, on the display unit, a notification indicating that a size of the currently worn earpiece worn by the user is a most suitable size among the sizes of the plurality of earpieces, or a notification for prompting replacement with another earpiece having a size larger or smaller than the size of the currently worn earpiece, based on the input operation related to the wearing feeling and a measurement result by the measurement process.

12 Claims, 16 Drawing Sheets

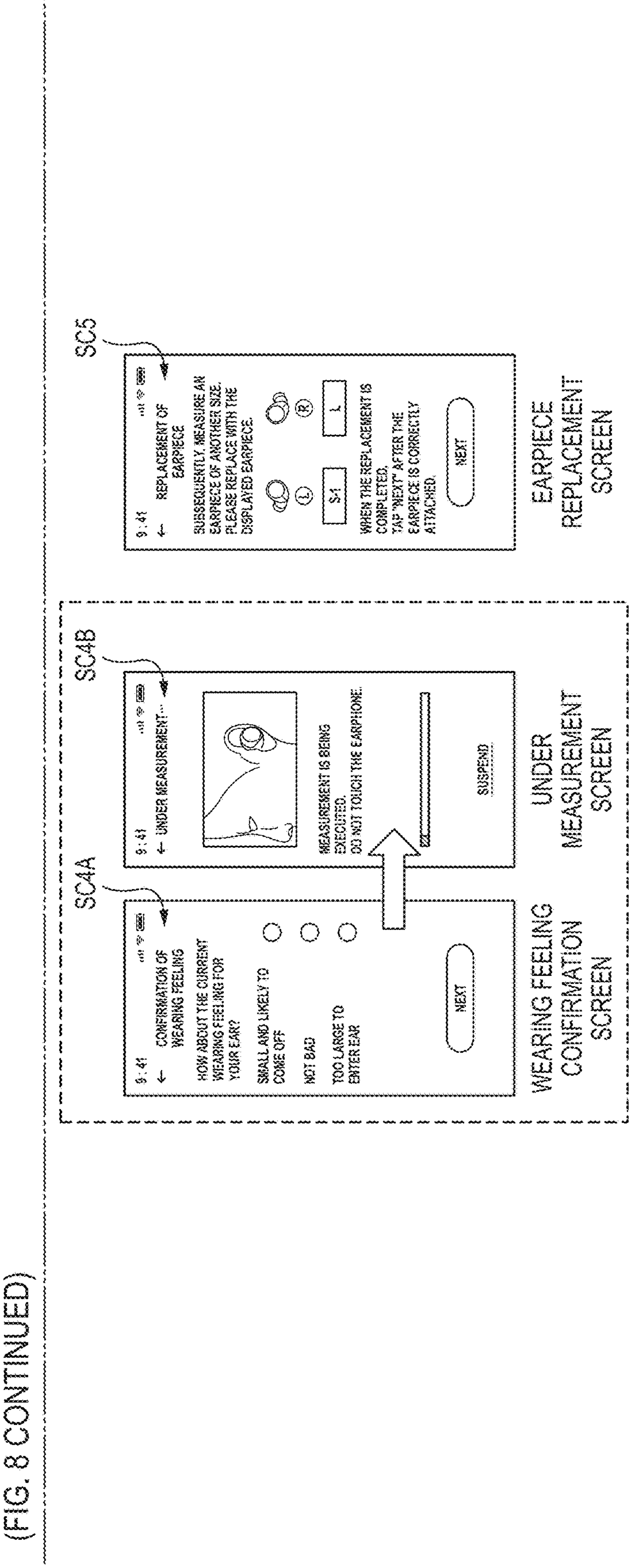
(FIG. 8 CONTINUED)

(FIG. 9 CONTINUED)
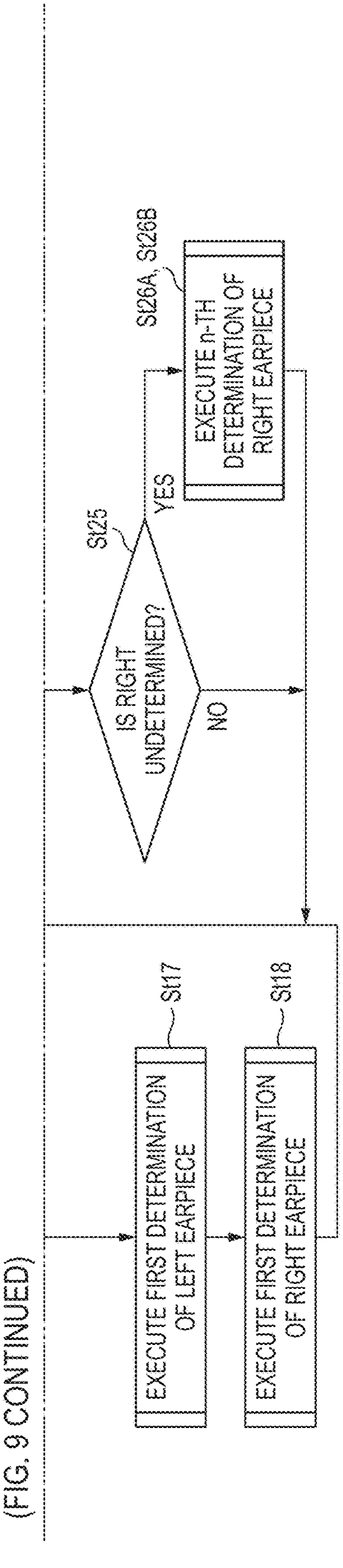

(FIG. 12 CONTINUED)
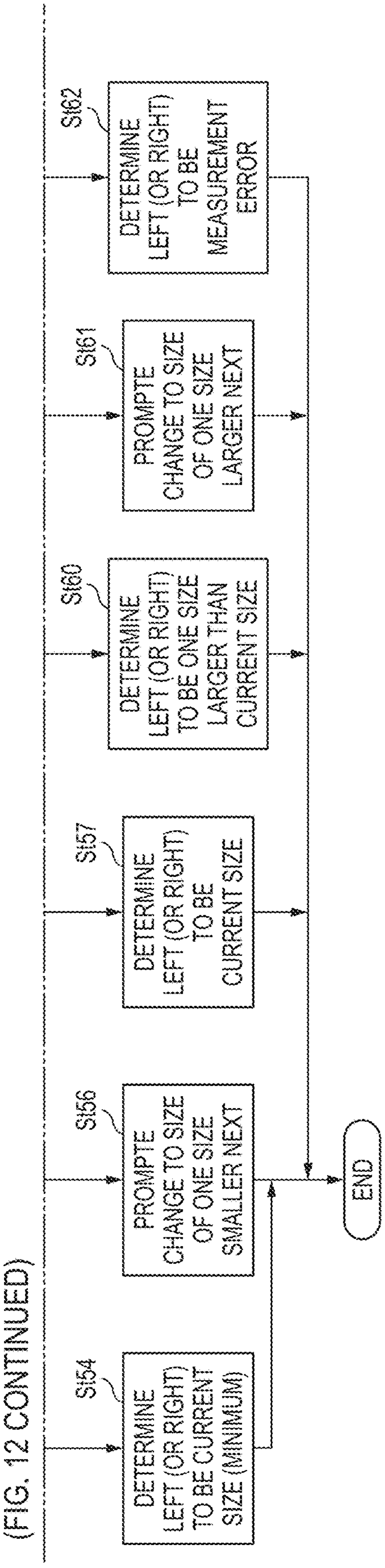

MEASUREMENT SYSTEM AND MEASUREMENT METHOD

CROSS-REFERENCE TO RELATED APPLICATIONS

This application is based on and claims priority under 35 USC 119 from Japanese Patent Application No. 2023-108871 filed on Jun. 30, 2023, the entire content of which is incorporated herein by reference.

TECHNICAL FIELD

The present disclosure relates to a measurement system and a measurement method.

BACKGROUND ART

Non-Patent Literature 1 discloses a measurement system in which an earphone and a terminal device are communicably connected to each other and which can measure an earpiece suitable for a size of an ear of a wearer (user). The measurement system measures whether the ear of the user is sealed by the earpiece when the user wears the earphone. In a case where the measurement is executed on a plurality of earpieces, the measurement system causes the terminal device to display a result indicating that, among earpieces that have received a measurement result indicating that the ear of the user is sealed, an earpiece having a minimum size is an earpiece having an optimum size for the ear of the user.

CITATION LIST

Non-Patent Literature

Non-Patent Literature 1: Sony Corporation, "WF-1000XM4 Wireless Noise Cancelling Headphones", Jun. 25, 2021, [online], [searched on Nov. 2, 2021], Internet <URL: https://www.sony.com/en-sa/electronics/truly-wireless/wf-1000xm4 #made-to-fit-you>

SUMMARY OF INVENTION

Recently, a style has appeared in which a user inserts completely wireless earphones, which are also referred to as true wireless stereos (TWS), into both left and right ears for use, respectively. Such a completely wireless earphone is provided with a speaker and a microphone that picks up an external sound. The completely wireless earphone analyzes the sound picked up by the microphone to execute noise cancelling and output a high-quality sound from the speaker. In order to allow the sound output from the speaker to reach the ear of the user without lowering the quality of the sound, the ear of the user needs to be sealed by an earpiece attached on the completely wireless earphone. As a method of outputting a high-quality sound from the completely wireless earphone, the noise cancelling is an example and the method is not limited thereto.

In Non-Patent Literature 1, in a case where the earpiece having an optimum size for the ear of the user is measured, it is necessary to measure earpieces of all sizes for each of right and left completely wireless earphones, there is a problem that a work of the user replacing the earpiece becomes complicated as the number of types of the size of the earpiece is larger, and there is room for improvement from the viewpoint of improving convenience for the user.

The present disclosure has been made in view of the above-described situation in the related art, and an object of the present disclosure is to provide a measurement system and a measurement method of efficiently specifying an earpiece having a size presumed to be optimum for an own ear of a user and improving convenience for the user at the time of selecting the earpiece.

The present disclosure provides a measurement system including two earphones which are respectively worn in a left ear and a right ear of a user and in which a plurality of earpieces having different sizes are replaceably attached on one end side of each earphones, and a wireless terminal carried by the user. The earphone includes a speaker and a microphone, and picks up a sound by the microphone in a case where a currently worn earpiece, which is any of the plurality of earpieces, is worn in the left ear or the right ear of the user and a sound signal transmitted from the wireless terminal or a sound signal output from the earphone is output from the speaker. The measurement system executes a measurement process at least once on whether the currently worn earpiece is sealed in the left ear or the right ear of the user based on the picked-up sound signal. The wireless terminal includes a display unit, receives an input operation related to a wearing feeling of the currently worn earpiece worn in the left ear or the right ear of the user, and displays, on the display unit, a notification indicating that a size of the currently worn earpiece worn by the user is a most suitable size among the sizes of the plurality of earpieces, or a notification for prompting replacement with another earpiece having a size larger or smaller than the size of the currently worn earpiece, based on the input operation related to the wearing feeling and a measurement result by the measurement process.

Further, the present disclosure provides a measurement method of controlling two earphones which are respectively worn in a left ear and a right ear of a user and in which a plurality of earpieces having different sizes are replaceably attached on one end side of each earphones, and a wireless terminal carried by the user. The measurement method includes picking up a sound by a microphone provided in the earphone in a case where a currently worn earpiece, which is any of the plurality of earpieces, is worn in the left ear or the right ear of the user and a sound signal transmitted from the wireless terminal or a sound signal output from the earphone is output from a speaker provided in the earphone, executing a measurement process at least once on whether the currently worn earpiece is sealed in the left ear or the right ear of the user based on the picked-up sound signal, and receiving an input operation related to a wearing feeling of the currently worn earpiece worn in the left ear or the right ear of the user, and displaying, on a display unit provided in the wireless terminal, a notification indicating that a size of the currently worn earpiece worn by the user is a most suitable size among the sizes of the plurality of earpieces, or a notification for prompting replacement with another earpiece having a size larger or smaller than the size of the currently worn earpiece, based on the input operation related to the wearing feeling and a measurement result by the measurement process.

These comprehensive or specific aspects may be implemented by a system, a device, a method, an integrated circuit, a computer program, or a recording medium, and may be implemented by any combination of the system, the device, the method, the integrated circuit, the computer program, and the recording medium.

According to the present disclosure, it is possible to efficiently specify an earpiece having a size presumed to be optimum for an own ear of a user, and to improve convenience for the user at the time of selecting the earpiece.

DESCRIPTION OF EMBODIMENTS

Hereinafter, embodiments in which a measurement system and a measurement method are specifically disclosed in the present disclosure will be described in detail with reference to the drawings as appropriate. However, more detailed description may be omitted. For example, detailed description of already well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

Figure 1:
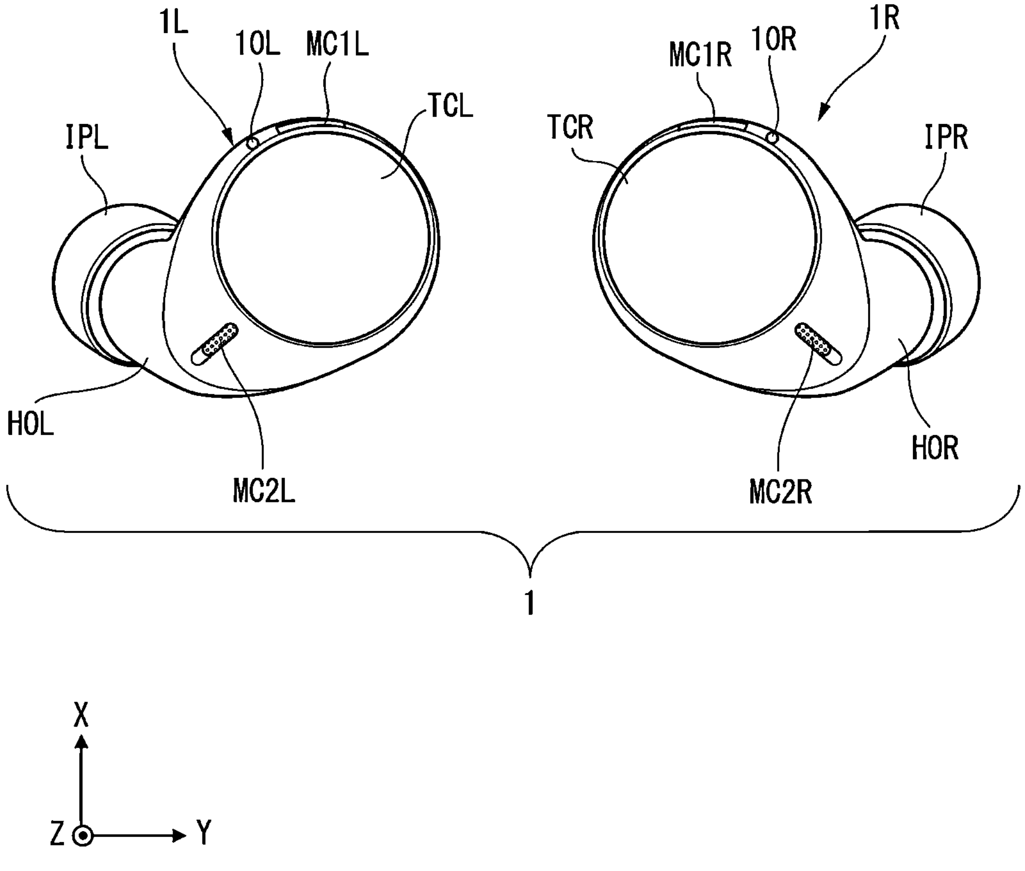
FIG. 1 is a front view of an earphone according to the present embodiment.
Figure 2:
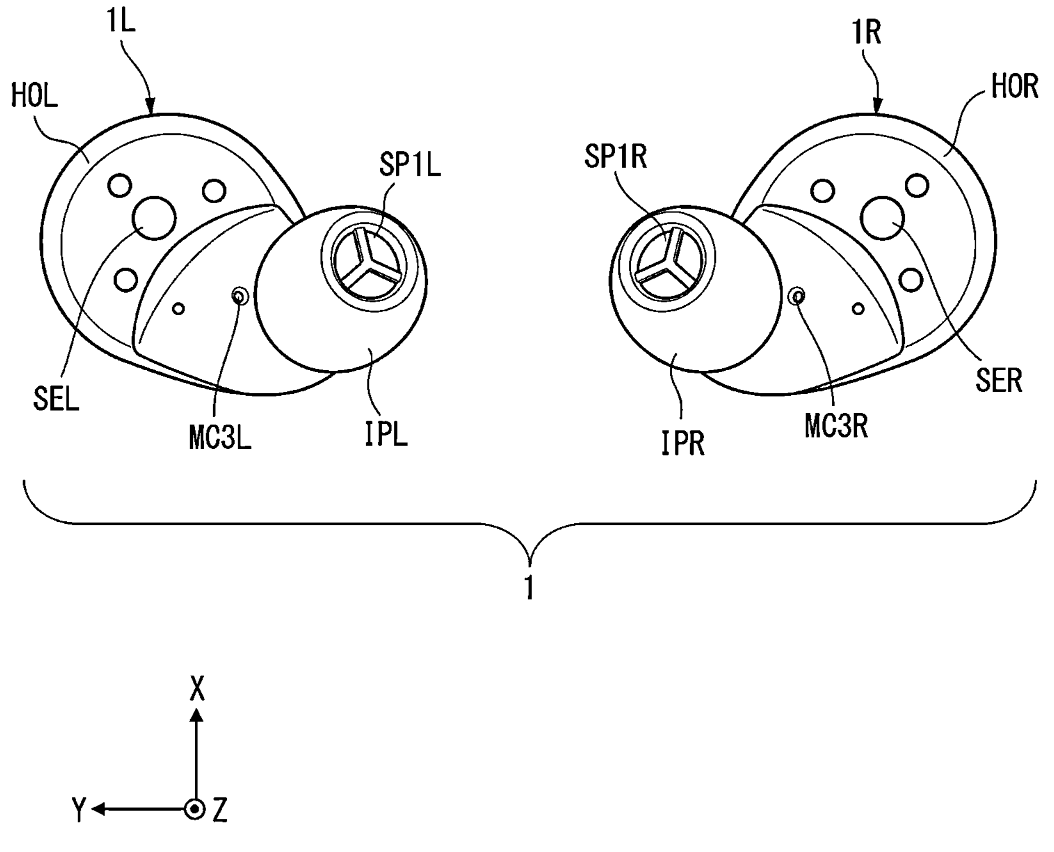
FIG. 2 is a rear view of the earphone according to the present embodiment.

First, a hardware configuration of an earphone will be described with reference to FIGS. 1 and 2. FIG. 1 is a front view of the earphone. FIG. 2 is a rear view of the earphone.

For convenience of description, an axis orthogonal to a surface of a touch sensor TCL of an earphone 1L as illustrated in FIG. 1 is defined as a Z-axis. An axis perpendicular to the Z-axis (that is, parallel to the touch sensor TCL of the earphone 1L) and extending from the earphone 1L to an earphone 1R is defined as a Y-axis. An axis perpendicular to the Y-axis and the Z-axis is defined as an X-axis. In the present embodiment, an orientation of the earphone 1L relating to FIG. 1 is defined as a front view. Expressions relating to these directions are used for convenience of description and are not intended to limit a posture of the structure in actual use. The same applies to other drawings.

In the present embodiment, in a pair of left and right earphones 1L and 1R, configurations of the earphone 1L of a left ear and the earphone 1R of a right ear are the same. Reference numerals of the same components are expressed by adding "L" at the end thereof for the earphone 1L of the left ear, and adding "R" at the end thereof for the earphone 1R of the right ear. In the following description, only the left earphone 1L on one side will be described, and the description of the right earphone 1R on the other side will be omitted.

An earphone 1 includes the two earphones of 1L and 1R which are respectively worn in the left ear and the right ear of a user and in which a plurality of earpieces having different sizes are replaceably attached on one end side of each.

As illustrated in FIG. 1, the earphone 1L is an inner type acoustic device used by being worn in an ear of the user, and receives sound data (for example, music data) transmitted wirelessly (for example, by short-range wireless communication such as Bluetooth (registered trademark)) from an external device such as a smartphone or a portable music player carried by the user. The earphone 1L acoustically outputs a sound signal based on the received sound data. In addition, the earphone 1L is placed on a cradle (not illustrated) which is a charging case when the earphone 1L is not in use. In a case where a battery B1L (FIG. 3) built in the earphone 1L is not fully charged or the like, when the earphone 1L is placed on a predetermined placement position of the cradle, the battery B1L built in the earphone is charged based on power transmitted from the cradle.

A housing HOL is provided as a structural member of the earphone 1L. The housing HOL is made of a composite of materials such as synthetic resin, metal, and ceramic, and has an accommodation space formed therein. In addition, the housing HOL is provided with an attachment cylindrical portion (not illustrated) communicating with the accommodation space.

The earphone 1L includes an earpiece IPL attached on a main body of the earphone 1L. For example, the earphone 1L is held in a state of being inserted into an inside of an ear canal by the earpiece IPL with respect to the ear of the user, and this held state is a use state of the earphone 1L.

The earpiece IPL is made of a flexible member such as silicon and is injection-molded with an inner tubular portion (not illustrated) and an outer tubular portion (not illustrated). The earpiece IPL is fixed by being inserted into the attachment cylindrical portion of the housing HOL at the inner tubular portion thereof, and is provided to be replaceable (detachable) with respect to the attachment cylindrical portion of the housing HOL. The earpiece IPL is worn in the ear canal of the user at the outer tubular portion thereof, and is elastically deformed according to a shape of the ear canal on which the earpiece IPL is worn. By this elastic deformation, the earpiece IPL is held in the ear canal of the user. The earpiece IPL has a plurality of different sizes. The earpiece IPL is worn in the left ear of the user with an earpiece of any size among earpieces having the plurality of different sizes attached on the earphone 1L (hereinafter, the earpiece worn in the ear of the user is referred to as a "currently worn earpiece").

As an example of an operation input unit, the touch sensor TCL is provided on the other end side opposite to the one end side on which the earpiece IPL of the housing HOL is arranged as illustrated in FIG. 1. The touch sensor TCL is a sensor element having a touch sensor function of detecting an input operation (for example, a touch operation) of the user. The sensor element is, for example, an electrode of an electrostatic capacitive touch sensor. The touch sensor TCL may be formed as, for example, a circular surface, or may be formed as, for example, an elliptical surface. In addition, the touch sensor TCL may be formed as a rectangular surface.

Examples of the touch operation performed on the touch sensor TCL by a finger of the user or the like include the following operations. In a case where a touch operation for a short time is performed, the earphone 1L may instruct an external device to execute any of playing, stopping, skipping forward, skipping back, and the like of music. In a case where a touch operation for a long time (so-called long-press touch) is performed, the earphone 1L may execute a pairing operation or the like for executing wireless communication such as Bluetooth (registered trademark) with an external device such as a smartphone. In addition, in a case where a surface of the touch sensor TCL is traced with the finger (so-called swiping operation), the earphone 1L may execute, for example, volume adjustment of music being played.

A light 10L (an example of a light emitting element) is disposed at a position on one end side of a casing of the earphone 1L corresponding to an end portion on an operation surface (for example, an upper end portion of an operation surface along a +X direction) of the touch sensor TCL provided so as to be exposed to the housing HOL. As an example of the light 10L, a light emission diode (LED) can be used. The light 10L is used, for example, in a case where the external device and the earphone 1L are associated with each other on a one-to-one basis (hereinafter, referred to as pairing) by wirelessly communicating with the external device carried by the user. The light 10L indicates operations such as lighting up when the pairing is completed, blinking in a single color, and blinking in different colors. An application and an operation method of the light 10L are merely examples, and the present invention is not limited thereto.

The earphone 1L includes a plurality of microphones (microphone MC1L, microphone MC2L, and microphone MC3L) as electric and electronic members. The plurality of microphones are accommodated in the accommodation space (not illustrated) of the housing HOL.

As illustrated in FIG. 1, the microphone MC1L is provided on the housing HOL, and is disposed so as to be capable of picking up an ambient sound or the like outside the earphone 1L. That is, the microphone MC1L can detect an ambient sound of the user in a state where the earphone 1L is worn in the ear of the user. The microphone MC1L converts the ambient sound outside into an electric signal (sound signal) and sends the electric signal to a sound signal input and output control unit S1L.

The microphone MC2L is provided on the housing HOL as illustrated in FIG. 1, and is disposed so as to be capable of picking up a voice signal based on an utterance of the user wearing the earphone 1L. Therefore, the earphone 1L can implement a so-called hands-free call in a state where the earphone 1L can communicate with a mobile phone device such as a smartphone F1 of the user. The microphone MC2L is implemented by a microphone device capable of picking up a voice (that is, detecting a voice signal) generated based on the utterance of the user. The microphone MC2L picks up the voice generated based on the utterance of the user, converts the voice into an electric signal, and transmits the electric signal to the sound signal input and output control unit S1L. The microphone MC2L is disposed such that an extending direction of the earphone 1L is directed to the mouth of the user when the earphone 1L is inserted into the left ear of the user (see FIG. 1), and is disposed at a position below the touch sensor TCL (that is, in a-X direction). The voice uttered by the user will be converted into an electric signal when the voice is picked up by the microphone MC2L, and presence or absence of the utterance of the user by the microphone MC2L can be detected according to a size of the electric signal.

As illustrated in FIG. 2, the microphone MC3L is disposed in a surface in the vicinity of the attachment cylindrical portion of the housing HOL and is disposed as close as possible to the ear canal of the left ear of the user. The microphone MC3L converts a sound leaking from between the ear of the user and the earpiece IPL in a state where the earphone 1L is worn in the ear of the user into an electric signal (sound signal) and transmits the electric signal to the sound signal input and output control unit S1L.

As illustrated in FIG. 2, a speaker SP1L is disposed in the attachment cylindrical portion of the housing HOL. The speaker SP1L is an electronic component and acoustically outputs sound data (for example, music data) wirelessly transmitted from the external device. Inside the housing HOL, a front surface (in other words, a sound releasing surface of the sound to be acoustically output) of the speaker SP1L is directed toward an attachment cylindrical portion side of the housing HOL covered with the earpiece IPL. Accordingly, the music data acoustically output from the speaker SP1L is further transmitted from an ear hole (for example, an external ear portion) of the user to an inner ear and an eardrum inside, and the user can listen to the music data.

A wearing sensor SEL is implemented by a device that detects whether an earphone is worn in the left ear of the user and is implemented by using, for example, an infrared sensor or an electrostatic sensor. In a case of an infrared sensor, when the earphone 1L is worn in the left ear of the user, the wearing sensor SEL can detect wearing of the earphone 1L in the left ear of the user by receiving infrared rays emitted from the wearing sensor SEL and reflected inside the left ear. In addition, when the earphone 1L is not worn in the left ear of the user, the wearing sensor SEL can detect non-wearing of the earphone 1L in the left ear of the user by not receiving the infrared rays emitted from the wearing sensor SEL without being reflected. On the other hand, in a case of an electrostatic sensor, when the earphone 1L is worn in the left ear of the user, the wearing sensor SEL can detect wearing in the left ear of the user by determining that a change value of an electrostatic capacity corresponding to a distance to the left ear of the user is larger than a threshold value held by the wearing sensor SEL. In addition, when the earphone 1L is not worn in the left ear of the user, the wearing sensor SEL can detect non-wearing in the left ear of the user by determining that the change value of the electrostatic capacity is smaller than the threshold value held by the wearing sensor SEL. The wearing sensor SEL is provided at a position facing the ear canal when the earphone 1L is inserted into the left ear of the user and on a back surface side of the touch sensor TCL.

As described above, the earphone 1L includes the speaker SP1L and the microphone MC3L, and the currently worn earpiece, which is any earpiece of the plurality of earpieces, is worn in the left ear or the right ear of the user.

Figure 3:
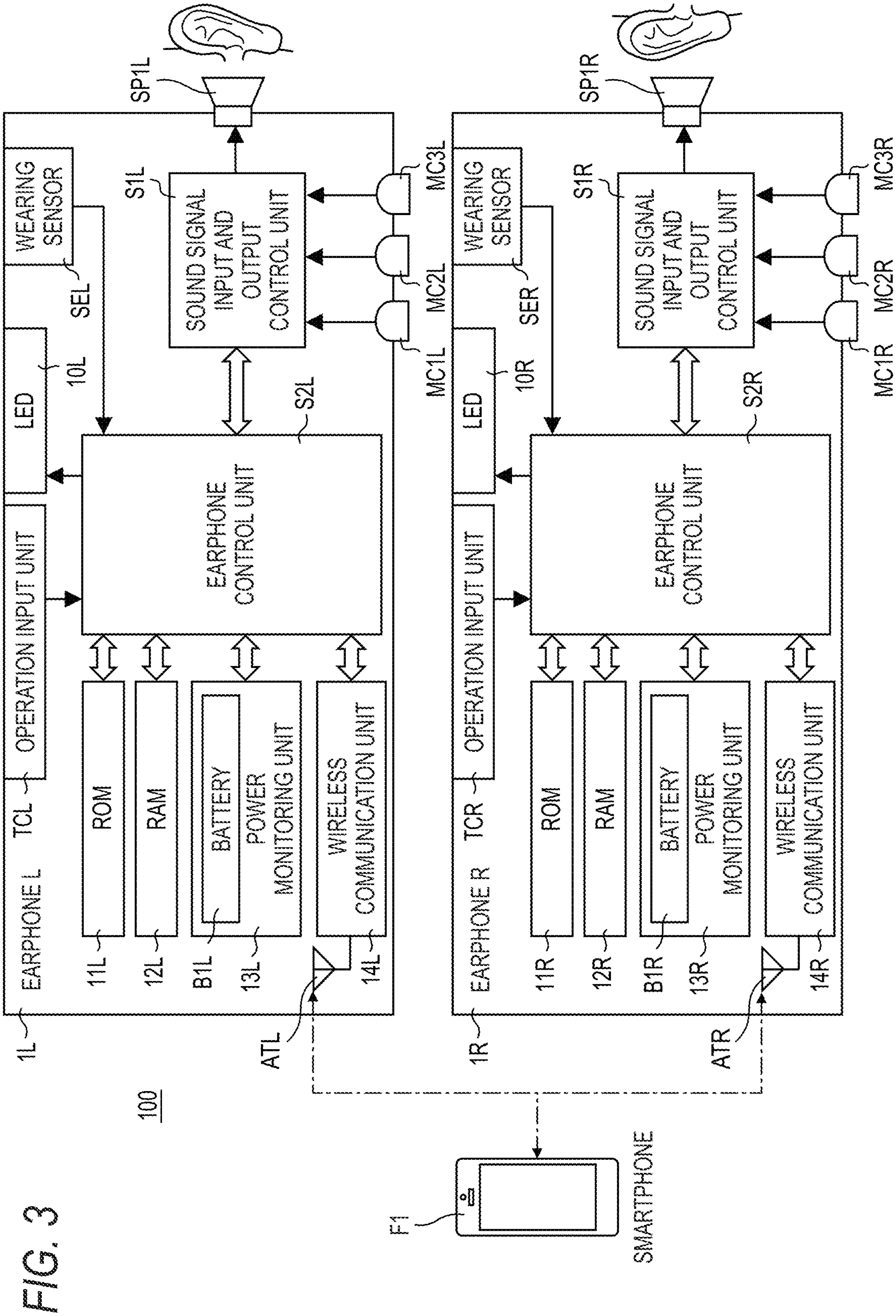
FIG. 3 is a block diagram of the earphone according to the present embodiment.

Next, a block diagram of the earphone will be described with reference to FIG. 3. FIG. 3 is a diagram illustrating a block diagram of the earphone according to the present embodiment. FIG. 3 is a block diagram of each of the pair of left and right earphones 1L and 1R illustrated in FIGS. 1 and 2. A configuration of the earphone 1L of the pair of left and right earphones 1L and 1R will be described below, and a configuration of the earphone 1R is the same as that of the earphone 1L. Therefore, the description of the earphone 1R is similarly omitted in FIG. 3.

A measurement system 100 includes the earphone 1L, the earphone 1R, and the smartphone F1.

The touch sensor TCL, which is an example of the operation input unit, is communicably connected to an earphone control unit S2L. The touch sensor TCL outputs a signal related to a touch operation performed by the user to the earphone control unit S2L.

The wearing sensor SEL is communicably connected to the earphone control unit S2L, and outputs a signal related to whether the ear of the user is in contact with the earphone 1L to the earphone control unit S2L.

A power monitoring unit 13L is implemented by, for example, a semiconductor chip. The power monitoring unit 13L includes the battery B1L and measures a remaining charge amount of the battery B1L. The battery B1L is, for example, a lithium ion battery. The power monitoring unit 13L outputs information on the measured remaining charge amount of the battery B1L to the earphone control unit S2L.

The sound signal input and output control unit S1L is implemented by using, for example, a processor such as a central processing unit (CPU), a micro processing unit (MPU), or a digital signal processor (DSP). The sound signal input and output control unit S1L is communicably connected to the earphone control unit S2L, and exchanges a sound signal as a digital signal in which the sound signal is converted into a digital format by a pulse code modulation (PCM) method. The sound signal input and output control unit S1L adjusts a volume level of a digital signal related to a sound signal acquired from the smartphone F1 and outputs the digital signal to the speaker SPIL.

The sound signal input and output control unit S1L is connected to the microphone MC1L, the microphone MC2L, and the microphone MC3L, and receives, from each of the microphones, a sound signal picked up by each of the microphones. The sound signal input and output control unit S1L may be capable of executing processes such as amplifying the sound signal received from each of the microphones or converting an analog signal into a digital signal. The sound signal input and output control unit transmits data of the sound signal received from each of the microphones to the earphone control unit S2L.

The earphone control unit S2L is implemented by using a processor such as a CPU, a MPU, or a DSP, is communicably connected to the sound signal input and output control unit S1L, a ROM 11L, a RAM 12L, the power monitoring unit 13L, and a wireless communication unit 14L, and exchanges a sound signal as a digital signal in which the sound signal is converted into a digital format by a PCM method. The earphone control unit S2L functions as a controller that controls an overall operation of the earphone 1L, and executes a control process for integrally controlling operations of respective units of the earphone 1L, an input and output process of data with the respective units of the earphone 1L, an arithmetic process of data, and a storage process of data.

The earphone control unit S2L causes the light 10L to light up, blink, or the like in a case where a signal input from the touch sensor TCL is acquired. For example, the light 10L blinks in a single color or alternately blinks in different colors in a case where the pairing is executed with the external device via wireless communication such as Bluetooth (registered trademark) from the earphone control unit S2L. This operation is an example, and the operation of the light 10L is not limited thereto. In addition, the earphone control unit S2L may acquire the information on the remaining charge amount of the battery B1L from the power monitoring unit 13L, and may cause the light 10L to light up or blink according to the remaining charge amount of the battery B1L.

The earphone control unit S2L receives the sound signal picked up by the microphone MC3L from the sound signal input and output control unit S1L. The earphone control unit S2L executes a process such as amplifying the sound signal received from the sound signal input and output control unit S1L and transmits the sound signal to the wireless communication unit 14L. The earphone control unit S2L may execute measurement relating to whether the ear of the user is sealed by the currently worn earpiece based on the sound signal picked up by the microphone MC3L.

The sound signal input and output control unit S1L and the earphone control unit S2L implement respective functions thereof by using programs and data stored in the read only memory (ROM) 11L. The sound signal input and output control unit S1L and the earphone control unit S2L may use the random access memory (RAM) 12L during operation and temporarily store generated or acquired data or information in the RAM 12L.

The wireless communication unit 14L wirelessly connects the earphone 1L and the smartphone F1 so as to enable transmission and reception, and transmits a sound signal processed by the sound signal input and output control unit S1L or the earphone control unit S2L to the smartphone F1. The wireless communication unit 14L includes an antenna ATL and executes short-range wireless communication according to a communication standard of Bluetooth (registered trademark), for example. The wireless communication unit 14L may be provided to be connectable to a communication line such as Wi-Fi (registered trademark) or a mobile communication line. In addition, the earphones 1L and 1R can individually execute wireless communication with the smartphone F1 using the wireless communication unit 14L and a wireless communication unit 14R. Therefore, each of the earphones 1L and 1R can receive data, a sound signal, or information transmitted from the smartphone F1.

The smartphone F1 is a wireless terminal carried by the user.

Figure 4:
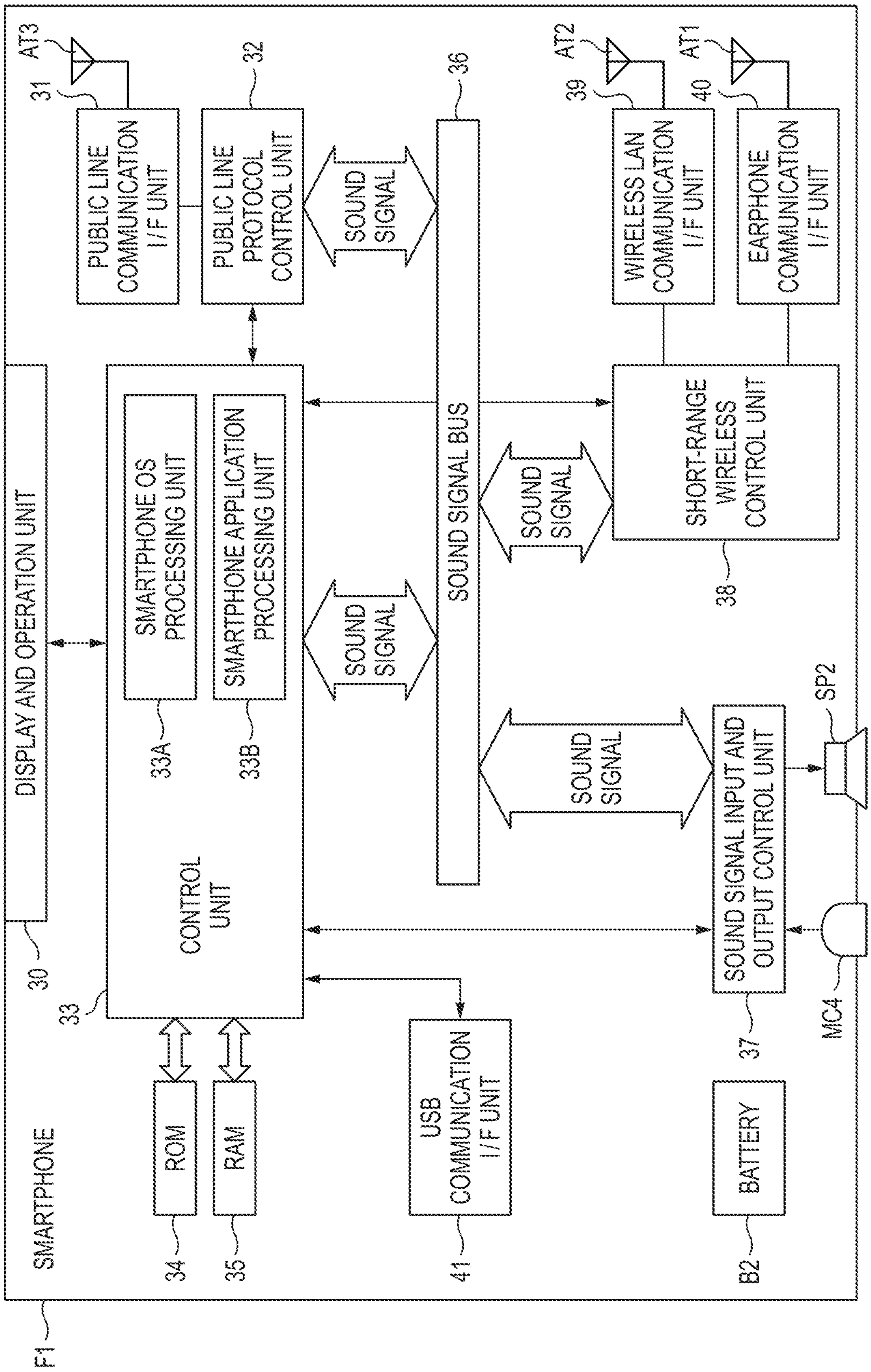
FIG. 4 is a block diagram of a smartphone according to the present embodiment.

Next, a hardware configuration example of a smartphone will be described using a block diagram of the smartphone with reference to FIG. 4. FIG. 4 is a diagram illustrating the block diagram of the smartphone according to the present embodiment. The smartphone F1 includes a display and operation unit 30, a public line communication I/F unit 31, a public line protocol control unit 32, a control unit 33, a ROM 34, a RAM 35, a sound signal bus 36, a sound signal input and output control unit 37, a short-range wireless control unit 38, a wireless LAN communication I/F unit 39, an earphone communication I/F unit 40, a USB communication I/F unit 41, and a battery B2. In FIG. 4, an interface is abbreviated as "I/F".

The display and operation unit 30 as an example of a display unit or an operation unit is implemented by a touch panel and forms a so-called user interface, the touch panel receiving an operation of the user and displaying data generated by the control unit 33. The display and operation unit 30 may display various screens generated by the control unit 33. The display and operation unit 30 receives operations of the user on the displayed various screens, generates input signals, and transmits the input signals to the control unit 33.

The public line communication I/F unit 31 is connected to an antenna AT3 provided in the smartphone F1, and executes wireless communication (for example, wireless communication conforming to a fourth generation mobile communication system (4G) such as long term evolution (LTE) or a fifth generation mobile communication system (5G)) with a public base station (not illustrated) using a public line. The public line communication I/F unit may be omitted from the configuration of the smartphone F1.

The public line protocol control unit 32 executes control related to input and output of data between the sound signal bus 36 and the public line communication I/F unit 31. The public line protocol control unit 32 may be omitted from the configuration of the smartphone F1.

The control unit 33 is implemented by using, for example, a processor such as a CPU, a MPU, or a DSP. A smartphone OS processing unit 33A and a smartphone application processing unit 33B are functionally provided, and various types of processing and control are executed by cooperation between each of the smartphone OS processing unit 33A and the smartphone application processing unit 33B with the ROM 34. The control unit 33 may execute measurement related to whether the ear of the user is sealed by the currently worn earpiece based on the sound signal picked up by the earphone 1 and transmitted from the earphone 1 to the smartphone F1.

A program that defines an operation of the control unit 33 and data used when the program is executed are written in the ROM 34. The ROM 34 respectively stores identification information of the smartphone F1 and identification information of the earphone 1 registered (paired) in advance as a destination to which a sound signal is transmitted.

The RAM 35 is a RAM as a work memory used when each process of the control unit 33 is executed, and the RAM 35 temporarily stores data or information generated or acquired by the control unit 33.

The sound signal bus 36 inputs and outputs sound signal data to and from the control unit 33, sound signal data to and from the public line protocol control unit 32, sound signal data to and from the sound signal input and output control unit 37, and sound signal data to and from the short-range wireless control unit 38.

Based on a command output from the control unit 33, the sound signal input and output control unit 37 transmits sound signal data picked up by a microphone MC4 to the control unit 33 via the sound signal bus 36, and causes the sound signal input via the sound signal bus 36 to be output from a speaker SP2.

The microphone MC4 picks up a voice based on the utterance of the user who uses the smartphone F1, converts the voice into a sound signal, and transmits the converted sound signal to the sound signal input and output control unit 37. The sound signal picked up by the microphone MC4 is input to the control unit 33 via the sound signal input and output control unit 37 and the sound signal bus 36.

The speaker SP2 acoustically outputs the sound signal data received from the sound signal input and output control unit 37.

The short-range wireless control unit 38 executes control related to input and output of data between the sound signal bus 36 and the wireless LAN communication I/F unit 39 and between the sound signal bus 36 and the earphone communication I/F unit 40. The short-range wireless control unit 38 transmits the command output from the control unit 33 and the data of the sound signal input via the sound signal bus 36 to the wireless LAN communication I/F unit 39 or the earphone communication I/F unit 40. In addition, the short-range wireless control unit 38 may transmit the data of the sound signal input from the wireless LAN communication I/F unit 39 or the earphone communication I/F unit 40 to the control unit 33.

The wireless LAN communication I/F unit 39 is connected to an antenna AT2 provided in the smartphone F1, and executes wireless communication (for example, data transmission from the short-range wireless control unit 38) with the earphone 1 by a wireless LAN. The wireless LAN communication I/F unit 39 is implemented by using a communication circuit connectable to the Internet via a wireless LAN router (not illustrated). In addition, the wireless LAN communication I/F unit 39 may execute wireless communication (for example, wireless LAN such as Wi-Fi (registered trademark)) with each of the earphones 1L and 1R via the wireless LAN router (not illustrated) described above.

The earphone communication I/F unit 40 is connected to an antenna AT1 provided in the smartphone F1, and executes short-range wireless communication (for example, data transmission from the short-range wireless control unit 38) with the earphone 1 by Bluetooth. The USB communication I/F unit 41 is an interface for allowing the smartphone F1 and an external device (for example, personal computer (PC)) to communicate with each other in a wired manner such as by a cable. The USB communication I/F unit 41 is connected to the control unit 33 to enable data communication, and can transmit data from the external device to the control unit 33. In addition, electric charge may be supplied from an external commercial power supply to the battery B2 via the USB communication I/F unit 41.

The battery B2 is a battery (storage battery) capable of storing electric charge supplied from an external commercial power supply, and supplies power to the smartphone F1. The battery B2 may be detachable. The battery B2 may directly receive a supply of power from the external commercial power supply, or may supply power to the smartphone F1 in a state of being disconnected from the external commercial power supply.

Figure 5:
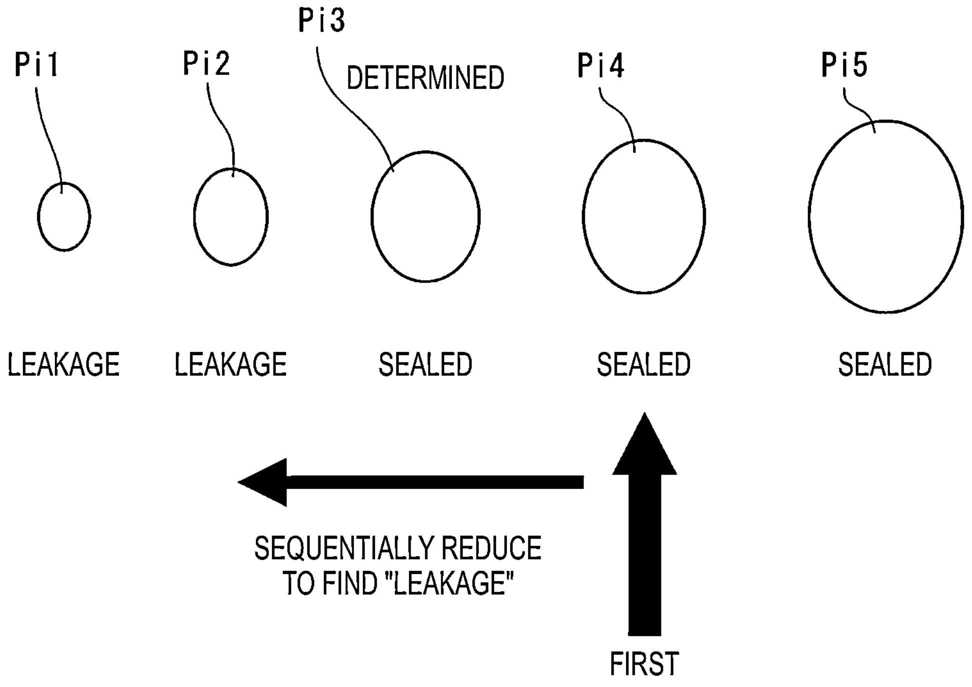
FIG. 5 is a diagram illustrating a first order of replacing earpieces in a measurement method of "normal"
Figure 6:
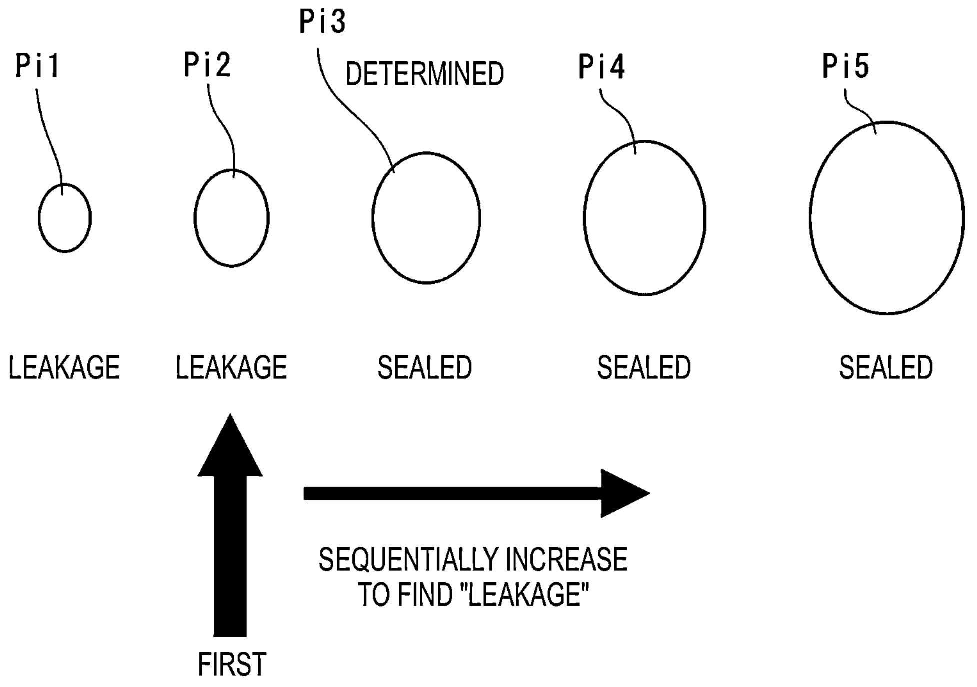
FIG. 6 is a diagram illustrating a second order of replacing the earpieces in the measurement method of "normal"

Next, an order of replacing the earpieces in the measurement method of "normal" will be described with reference to FIGS. 5 and 6. FIG. 5 is a diagram illustrating a first order of replacing the earpieces in the measurement method of "normal". FIG. 6 is a diagram illustrating a second order of replacing the earpieces in the measurement method of "normal".

Respective parts Pi1, Pi2, Pi3, Pi4, and Pi5 illustrated in FIGS. 5 and 6 are earpieces, and are schematically illustrated in order to explain a difference in size between the respective earpieces. The part Pi1 is an earpiece having a smallest size among the parts Pi1, Pi2, Pi3, Pi4, and Pi5. The part Pi2 is an earpiece having a size larger than that of the part Pi1 and smaller than that of the part Pi3. The part Pi3 is an earpiece having a size larger than that of the part Pi2 and smaller than that of the part Pi4. The part Pi4 is an earpiece having a size larger than that of the part Pi3 and smaller than that of the part Pi5. The part Pi5 is an earpiece having a largest size among the parts Pi1, Pi2, Pi3, Pi4, and Pi5.

In FIGS. 5 and 6, in a case where it is determined by either the smartphone F1 or the earphone 1 of the measurement system 100 that the currently worn earpiece seals the ear of the user, a state thereof is described as "sealed". In addition, in FIGS. 5 and 6, in a case where it is determined by either the smartphone F1 or the earphone 1 of the measurement system 100 that the currently worn earpiece does not seal the ear of the user, a state thereof is described as "leakage".

First, as illustrated in FIG. 5, an earpiece replacement procedure in a case where the currently worn earpiece worn by the user at the time of a first measurement is in a "sealed" state will be described. In the case where the currently worn earpiece worn by the user at the time of the first measurement is in the "sealed" state, the user wears an earpiece of a smaller size next to the earpiece currently worn. The user sequentially reduces the size of the earpiece, and repeats replacement of earpieces until an earpiece in a "leakage" state is found. In a case where the earpiece in the "leakage" state is found, an earpiece of one size larger than the earpiece in the "leakage" state first is determined to be an earpiece having a size presumed to be optimum for the ear of the user.

For example, in a case where the user first wears an earpiece having the part Pi4 and the earpiece having the part Pi4 is in a "sealed" state, the user next wears an earpiece having the part Pi3. In a case where the earpiece having the part Pi3 is in a "sealed" state, the user wears the earpiece having the part Pi2 next. In a case where the earpiece having the part Pi2 is in a "leakage" state, the earpiece having the part Pi3 is determined to be the earpiece having a size presumed to be optimum for the ear of the user.

As described above, in a case where the measurement result indicates that the currently worn earpiece worn by the user at the time of the first measurement is sealed in the left ear or the right ear of the user by either the smartphone F1 or the earphone 1 of the measurement system 100, the smartphone F1 displays, on the display and operation unit 30, a notification for prompting the user to replace the currently worn earpiece with an earpiece of a smaller size next to the currently worn earpiece. Thereafter, in a case where the measurement result is, among measurement results of a measurement process repeatedly executed by either the smartphone F1 or the earphone 1 of the measurement system 100, a measurement result indicating that the currently worn earpiece is not sealed in the left ear or right ear of the user for the first time, the smartphone F1 displays, on the display and operation unit 30, a notification indicating that an earpiece having a larger size next to the size of the currently worn earpiece corresponding to the measurement result is the earpiece having the size presumed to be optimum for the left ear or the right ear of the user.

Next, as illustrated in FIG. 6, an earpiece replacement procedure in a case where the currently worn earpiece worn by the user at the time of the first measurement is in a "leakage" state will be described. In the case where the currently worn earpiece worn by the user at the time of the first measurement is in the "leakage" state, the user wears an earpiece of a larger size next to the earpiece currently worn. The user sequentially increases the size of the earpiece, and repeats replacement of earpieces until an earpiece in a "sealed" state is found. In a case where the earpiece in the "sealed" state is found, an earpiece in the "sealed" state first is determined to be an earpiece having a size presumed to be optimum for the ear of the user.

For example, in a case where the user first wears the earpiece having the part Pi2 and the earpiece having the part Pi2 is in a "leakage" state, the user next wears the earpiece having the part Pi3. In a case where the part Pi3 is in a "sealed" state, the earpiece having the part Pi3 is determined to be the earpiece having a size presumed to be optimum for the ear of the user.

As described above, in a case where the measurement result indicates that the currently worn earpiece worn by the user at the time of the first measurement is not sealed in the left ear or the right ear of the user by either the smartphone F1 or the earphone 1 of the measurement system 100, the smartphone F1 displays, on the display and operation unit 30, a notification for prompting the user to replace the currently worn earpiece with an earpiece of a larger size next to the currently worn earpiece. Thereafter, in a case where the measurement result is, among measurement results of a measurement process repeatedly executed by either the smartphone F1 or the earphone 1 of the measurement system 100, a measurement result indicating that the currently worn earpiece is sealed in the left ear or right ear of the user for the first time, the smartphone F1 displays, on the display and operation unit 30, a notification indicating that an earpiece having the size of the currently worn earpiece corresponding to the measurement result is the earpiece having the size presumed to be optimum for the left ear or the right ear of the user.

Figure 7:
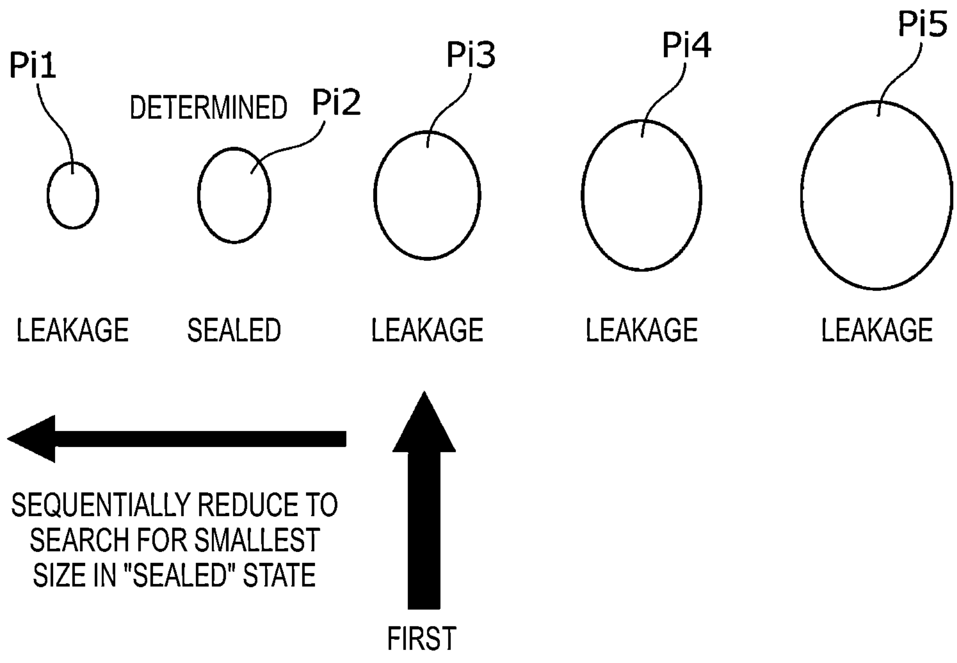
FIG. 7 is a diagram illustrating an order of replacing the earpieces in a measurement method of "small"

Next, an order of replacing the earpieces in the measurement method of "small" will be described with reference to FIG. 7. FIG. 7 is a diagram illustrating the order of replacing the earpieces in the measurement method of "small". Parts Pi1, Pi2, Pi3, Pi4, and Pi5 illustrated in FIG. 7 are the same earpieces as the earpieces illustrated in FIGS. 5 and 6.

In FIG. 7, the smartphone F1 receives a user operation related to a wearing feeling of the earpiece currently worn by the user. The wearing feeling of the earpiece indicates a feeling that the size of the earpiece that the user is wearing is larger or smaller than a size of the own left ear or right ear of the user, and a state in which the user feels that the earpiece that the user is wearing is too small and is likely to come off or the like is described as "small", and a state in which the user feels that the earpiece that the user is wearing is large is described as "large".

First, as illustrated in FIG. 7, an earpiece replacement procedure in a case where the wearing feeling of the currently worn earpiece worn by the user at the time of the first measurement is "large" will be described. In the case where the wearing feeling of the currently worn earpiece worn by the user at the time of the first measurement is "large", the user wears an earpiece of a smaller size next to the earpiece currently worn. The user sequentially reduces the size of the earpiece, and repeats replacement of earpieces until an earpiece in a "sealed" state and an earpiece again in a "leakage" state are found, and the earpiece of one size larger than the earpiece again in the "leakage" state is determined as the earpiece having a size presumed to be optimum for the ear of the user. The user sequentially reduces the size of the earpiece, and in a case where the earpiece in the "sealed" state is an earpiece of a minimum size, the earpiece of the minimum size is determined to be the earpiece having a size presumed to be optimum for the ear of the user.

For example, in a case where the user first wears the earpiece having the part Pi3 and the wearing feeling of the earpiece having the part Pi3 is "large" and "leakage", the user wears the earpiece having the part Pi2 next. In a case where the earpiece having the part Pi2 is "sealed", the user wears the earpiece having the part Pi1 next. In a case where the earpiece having the part Pi1 is "leakage", the earpiece having the part Pi2 is determined to be the earpiece having a size presumed to be optimum for the ear of the user.

As described above, in a case where the measurement result indicates that the currently worn earpiece worn by the user at the time of the first measurement is not sealed in the left ear or the right ear of the user by either the smartphone F1 or the earphone 1 of the measurement system 100, the smartphone F1 displays, on the display and operation unit 30, a notification for prompting the user to replace the currently worn earpiece with an earpiece of a smaller size next to the currently worn earpiece. Thereafter, in a case where the measurement result is, among measurement results of a measurement process repeatedly executed by either the smartphone F1 or the earphone 1 of the measurement system 100, a measurement result indicating that the currently worn earpiece is not sealed again by subsequently repeating the measurement even after the measurement result indicating that the currently worn earpiece was sealed in the left ear or the right ear of the user is obtained, the smartphone F1 displays, on the display and operation unit 30, a notification indicating that an earpiece having a larger size next to the size of the currently worn earpiece corresponding to the measurement result is the earpiece having the size presumed to be optimum for the left ear or the right ear of the user.

Figure 8:
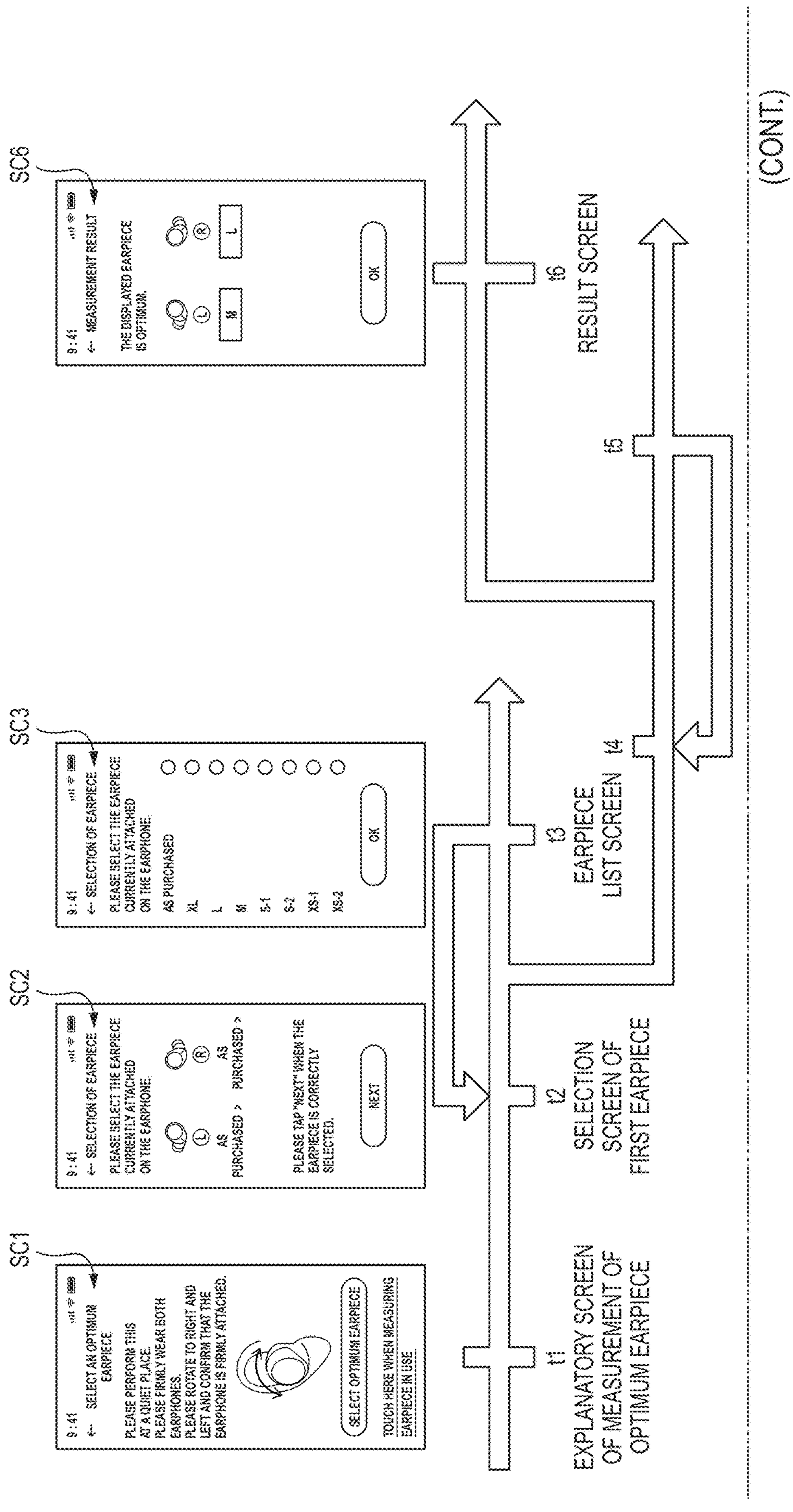
FIG. 8 is a diagram illustrating a transition example of screens of the smartphone.

Next, a transition example of screens of the smartphone will be described with reference to FIG. 8. FIG. 8 is a diagram illustrating the transition example of the screens of the smartphone. FIG. 8 illustrates a transition example of the screens generated by an application used when an earpiece presumed to have an optimum size for the ear of the user is measured. This application is executed by the smartphone application processing unit 33B of the smartphone F1.

Screen examples SC1, SC2, SC3, SC4A, SC4B, SC5, and SC6 illustrated in FIG. 8 are examples of screens displayed on the display and operation unit 30 generated by the control unit 33 (for example, smartphone application processing unit 33B). When the user performs input on the screen displayed on the display and operation unit 30, the screen transitions under control of the smartphone application processing unit 33B.

The screen example SC1 is displayed at a time t1 and is an explanatory screen of measurement of an earpiece presumed to have the optimum size for the ear of the user. The screen example SC1 includes, for example, a message such as an instruction to request the user to correctly perform the measurement. For example, the message may be "Please perform this at a quiet place.", "Please firmly wear both earphones.", or "Please rotate to right and left and confirm that the earphone is firmly attached." The message is not limited to those. When the user presses a button of "select an optimum piece" in the screen example SC1, the screen transitions to the screen example SC2 under the control of the smartphone application processing unit 33B.

The screen example SC2 is displayed at a time t2 and is a screen for requesting the user to input the size of the earpiece currently attached on the earphone 1. In a case where the size of the earpiece is input, the screen transitions to the screen example SC3 under the control of the smartphone application processing unit 33B.

The screen example SC3 is displayed at a time t3, and in a case where an instruction for prompting the user to input the size of the earpiece attached on the earphone 1L or 1R is output before a first measurement process by the control unit 33, the screen example SC3 includes, as one of options of the input, "as purchased" which is a size of an earpiece IPL or IPR attached on the earphone 1L or 1R in advance when the user purchases the earphone. When the user inputs the size of the earpiece and presses an "OK" button, the screen returns from the screen example SC3 to the screen example SC2 under the control of the smartphone application processing unit 33B. When the user completes the input of the sizes of the earpieces of the earphones of the right ear and the left ear and presses a "next" button, the screen transitions from the screen example SC2 to the screen example SC4A under the control of the smartphone application processing unit 33B.

The screen example SC4A is displayed at a time t4 and is a screen for receiving an input related to the wearing feeling of the earpiece currently worn by the user. The screen example SC4A receives a user operation related to the wearing feeling of the earpiece. The screen example SC4A includes, for example, a message of "how about the current wearing feeling for your ear?", and selection buttons capable of receiving a user operation related to the wearing feeling of the right or left earpiece, such as "small and is likely to come off", "not bad", and "too large to enter the ear". In the screen example SC4A, in a case where the user operation related to the wearing feeling of the earpiece is received, for example, a selection operation of an operation button such as "next" is received, and the screen transitions from the screen example SC4A to the screen example SC4B under the control of the smartphone application processing unit 33B.

The screen example SC4B is a screen indicating that an ear sealed state by the earpiece is being measured. The screen example SC4B is a screen indicating that the measurement is currently being executed when the measurement process is being executed by the control unit 33. For example, a message of "Measurement is being executed. Do not touch the earphone." is included. In addition, for example, a gauge indicating a progress status of the measurement is included. This progress status may be a percentage or a circle graph. When the measurement is completed, the screen transitions from the screen example SC4B to the screen example SC5 under the control of the smartphone application processing unit 33B. A transition order of the screen example SC4A and the screen example SC4B may be reversed. In such a case, the user inputs the wearing feeling of the earpiece after the ear sealed state by the earpiece is measured.

The screen example SC5 is displayed at a time t5 and is a screen for prompting the user to replace the earpiece. The screen example SC5 is a screen including at least the following: images or schematic diagrams of the earphones 1L and 1R of the respective left ear and right ear, sizes of respective earpieces to be measured next with respect to the earpieces currently worn in the respective left ear and right ear, and a text for prompting replacement with the earpieces of the sizes to be measured next. When the user presses a "next" button, the screen returns from the screen example SC5 to the screen example SC4B under the control of the smartphone application processing unit 33B.

The screen example SC6 is displayed at a time t6 and is a screen indicating that the measurement is completed. The screen example SC6 is a screen displayed when the control unit 33 executes the measurement process and the sizes of the earpieces presumed to be optimum for the ears of the user are determined. The screen example SC6 is a screen including at least the following: images or schematic diagrams of the earphones 1L and 1R of the respective left ear and right ear, and the sizes of the earpieces presumed to be optimum for the ears of the user based on results of the measurement process.

Figure 9:
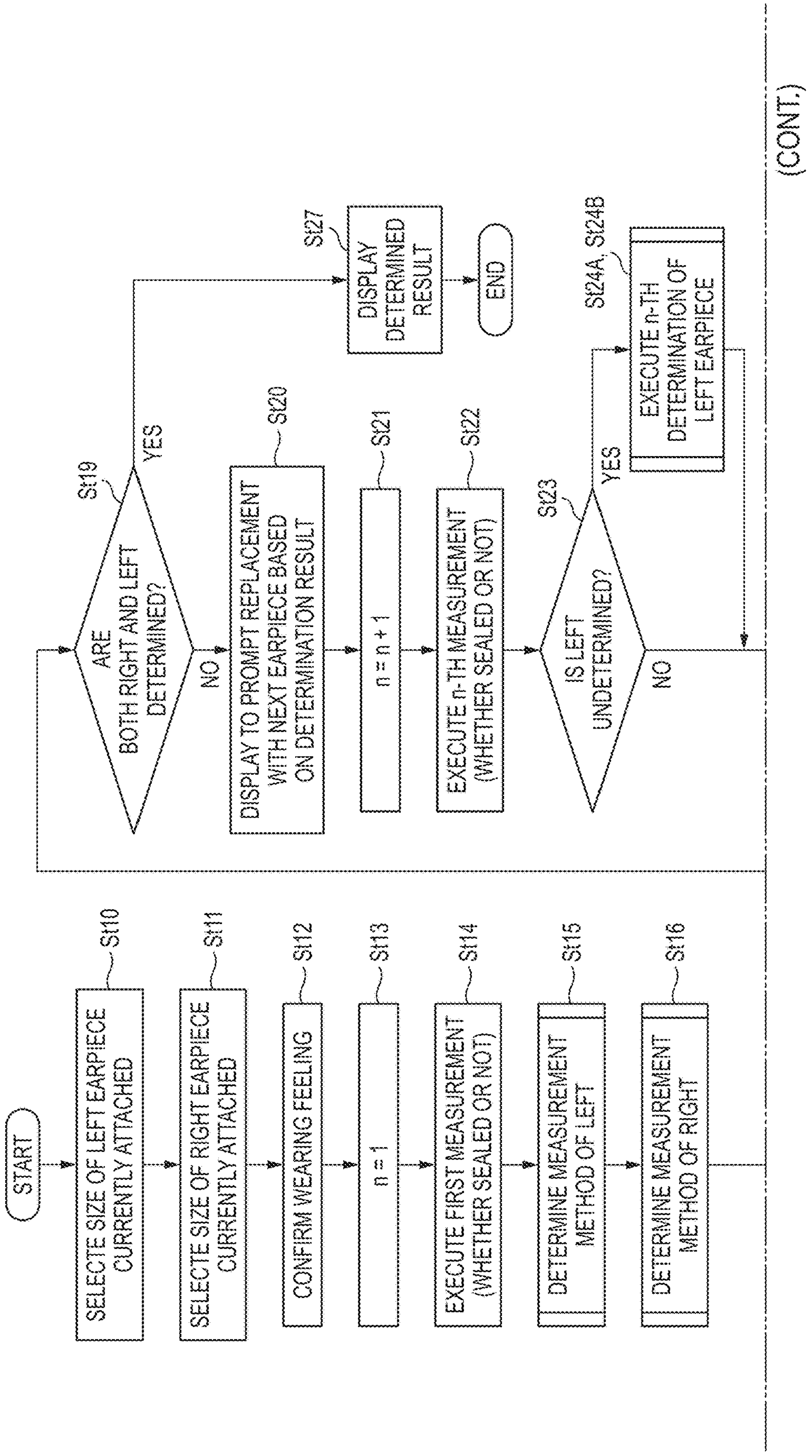
FIG. 9 is a flowchart for determining an earpiece of an appropriate size.

Next, a flowchart for determining an earpiece of an appropriate size will be described with reference to FIG. 9. FIG. 9 is the flowchart for determining the earpiece of the appropriate size. The flowchart in FIG. 9 is a process executed by the control unit 33.

Before the first measurement process, the display and operation unit 30 outputs a screen including a description of measurement of an earpiece presumed to have an optimum size for the ear of the user (see the screen example SC1 in FIG. 8). The display and operation unit 30 outputs an instruction for prompting the user to input a size of an earpiece attached on the earphone 1L after the screen is output and before the first measurement process (see the screen example SC2 and the screen example SC3 in FIG. 8). When an input for selecting the size of the earpiece IPL currently attached on the earphone 1L from the user is received, the display and operation unit 30 transmits a signal corresponding to an input content thereof to the control unit 33. The control unit 33 acquires a signal corresponding to information on the size of the earpiece IPL from the display and operation unit 30 (St10).

The display and operation unit 30 outputs an instruction for prompting the user to input a size of an earpiece attached on the earphone 1R before the first measurement process (see the screen example SC2 and the screen example SC3 in FIG. 8). When an input for selecting the size of the earpiece IPR currently attached on the earphone 1R from the user is received, the display and operation unit 30 transmits a signal corresponding to an input content thereof to the control unit 33. The control unit 33 acquires a signal corresponding to information on the size of the earpiece IPR from the display and operation unit 30 (St11).

The control unit 33 outputs an instruction for prompting the user of an input related to the wearing feeling of the earpiece currently worn in each of the right ear and the left ear of the user (see the screen example SC4A in FIG. 8). When inputs for selecting the wearing feelings of the earpieces IPL and IPR currently attached on the earphones 1L and 1R from the user are received, respectively, the display and operation unit 30 transmits a signal corresponding to an input content thereof to the control unit 33. The control unit 33 acquires a signal corresponding to information on the wearing feeling of each of the earpieces IPL and IPR from the display and operation unit 30 (St12).

The control unit 33 sets a parameter (n, n is an integer of 1 or more) indicating the number of times of measurement to 1 (St13).

The control unit 33 executes the first measurement process related to whether the currently worn earpiece is sealed in the left ear or the right ear of the user based on a sound signal acquired from the earphone 1 (St14).

The control unit 33 determines a measurement method of the earpiece IPL worn in the left ear based on the wearing feeling of the earpiece IPL of the left ear input in step St12 and a measurement result of whether the earpiece IPL of the left ear is sealed measured in step St14 (St15). The process of step St15 will be described with reference to FIG. 10.

The control unit 33 determines a measurement method of the earpiece IPR worn in the right ear based on the wearing feeling of the earpiece IPR of the right ear input in step St12 and a measurement result of whether the earpiece IPR of the right ear is sealed measured in step St14 (St16). The process of step St16 will be described with reference to FIG. 10.

The control unit 33 executes first determination of the earpiece IPL of the left ear based on the measurement result determined in the process of step St14 and a determination result of the measurement method of the earpiece of the left ear determined in the process of step St15 (St17). The process of step St17 will be described with reference to FIG. 11. In addition, when the control unit 33 is executing the process of step St14, the display and operation unit 30 outputs a screen indicating that measurement is currently being executed (see the screen example SC4B in FIG. 8).

The control unit 33 executes first determination of the earpiece IPR of the right ear based on the measurement result determined in the process of step St14 and a determination result of the measurement method of the earpiece of the right ear determined in the process of step St16 (St18). The process of step St18 will be described with reference to FIG. 11. In addition, when the control unit 33 is executing the process of step St14, the display and operation unit 30 outputs a screen indicating that measurement is currently being executed (see the screen example SC4B in FIG. 8).

The control unit 33 confirms whether the sizes of the earpieces IPL and IPR of the left ear and the right ear are both determined (St19). In a case where the sizes of the earpieces IPL and IPR of the left ear and the right ear are both determined in the process of step St19 (YES in St19), the determined result is displayed on the display and operation unit 30 (St27) (see the screen example SC6 in FIG. 8).

In the process of step St19, in a case where neither of the sizes of the earpieces IPL and IPR of the left ear and the right ear is determined, or in a case where the size of either of the earpieces is not determined (NO in St19), the control unit 33 generates a screen for prompting replacement with a next earpiece having a different size based on the determination result, and transmits the screen to the display and operation unit 30. The display and operation unit 30 displays the screen acquired from the control unit 33 (St20) (see the screen example SC5 in FIG. 8).

The control unit 33 adds the parameter (n) indicating the number of times of measurement by 1 (in other words, increments n) (St21).

The control unit 33 executes an n-th measurement process related to whether the currently worn earpiece is sealed in the left ear or the right ear of the user based on the sound signal acquired from the earphone 1 (St22).

The control unit 33 confirms whether the size of the earpiece IPL of the left ear is determined based on a result of the measurement process measured in the process of step St22 (St23). In a case where the size of the earpiece IPL of the left ear is not determined in the process of step St23 (YES in St23), the control unit 33 executes n-th determination of the earpiece IPL of the left ear (St24A and St24B). The processes of steps St24A and St24B will be described with reference to FIGS. 12 and 13. Step St24A is an n-th determination process of the earpiece IPL of the left ear in a case where the measurement method is “normal”. Step St24B is an n-th determination process of the earpiece IPL of the left ear in a case where the measurement method is “small”. After the processes of steps St24A and St24B are executed, the process of the control unit 33 proceeds to the process of step St25.

In a case where the size of the earpiece IPL of the left ear is determined in the process of step St23 (NO in St23), or after the processes of steps St24A and St24B are executed, the control unit 33 confirms whether the size of the earpiece IPR of the right ear is determined based on a result of the measurement process measured in the process of step St22 (St25). In a case where the size of the earpiece of the right ear is not determined in the process of step St25 (YES in St25), the control unit 33 executes n-th determination of the earpiece IPR of the right ear (St26A and St26B). The processes of steps St26A and St26B will be described with reference to FIGS. 12 and 13. Step St26A is an n-th determination process of the earpiece IPR of the right ear in a case where the measurement method is “normal”. Step St26B is an n-th determination process of the earpiece IPR of the right ear in a case where the measurement method is “small”.

In a case where the size of the earpiece IPR of the right ear is determined in the process of step St25 (NO in St25), or after the processes of steps St26A and St26B are executed, the process of the control unit 33 returns to the process of step St19.

Figure 10:
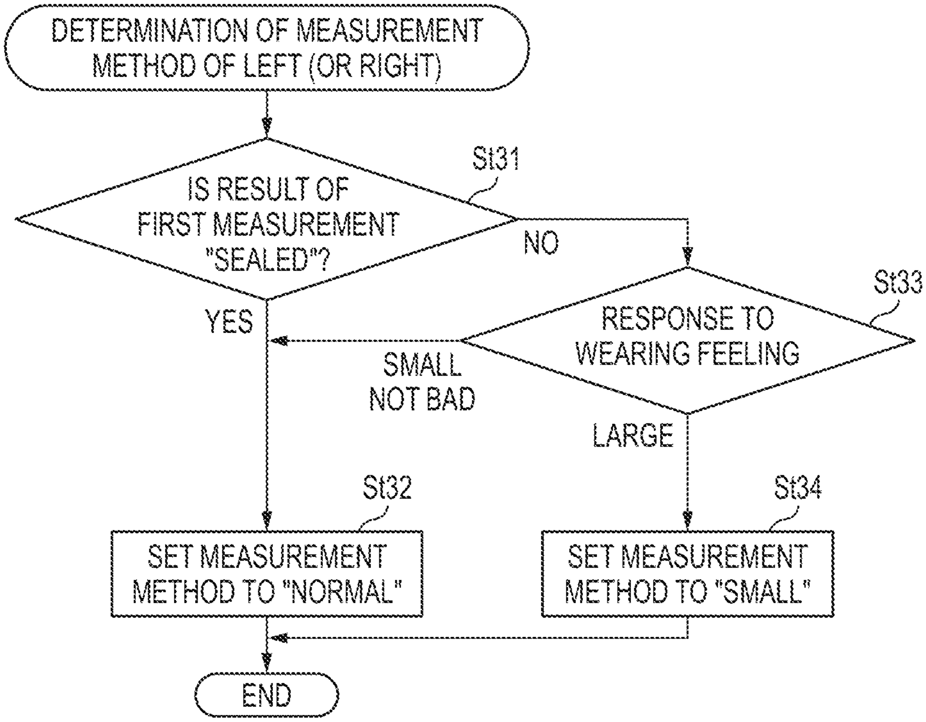
FIG. 10 is a flowchart relating to determination of the measurement method.

Next, a flowchart for determining the earpiece IPL or IPR of an appropriate size will be described with reference to FIG. 10. FIG. 10 is the flowchart related to determination of the measurement method. The flowchart in FIG. 10 is a process executed by the control unit 33. Hereinafter, only a case of the earpiece IPL of the left ear will be described, and a case of the earpiece IPR of the right ear will be omitted, but the same can be applied to the case of the earpiece IPR of the right ear by replacing the left ear with the right ear and replacing the earpiece IPL with the earpiece IPR.

The control unit 33 determines whether the measurement result of the earpiece IPL of the left ear measured in step St14 is "sealed" (St31).

In a case where it is determined that the measurement result of the earpiece IPL of the left ear measured in step St14 is "sealed" (YES in St31), the control unit 33 sets the measurement method of the earpiece IPL of the left ear to "normal" (St32).

In a case where it is determined that the measurement result of the earpiece IPL of the left ear measured in step St14 is "leakage" (NO in St31), the control unit 33 determines a result of response to the wearing feeling of the earpiece IPL of the left ear by the user (St33).

In a case where it is determined that the result of response to the wearing feeling of the earpiece IPL of the left ear by the user acquired in step St12 is "small" or "not bad" (small or not bad in St33), the control unit 33 sets the measurement method of the earpiece IPL of the left ear to "normal" (St32).

In a case where it is determined that the result of response to the wearing feeling of the earpiece IPL of the left ear by the user acquired in step St12 is "large" (large in St33), the control unit 33 sets the measurement method of the earpiece IPL of the left ear to "small" (St34).

Figure 11:
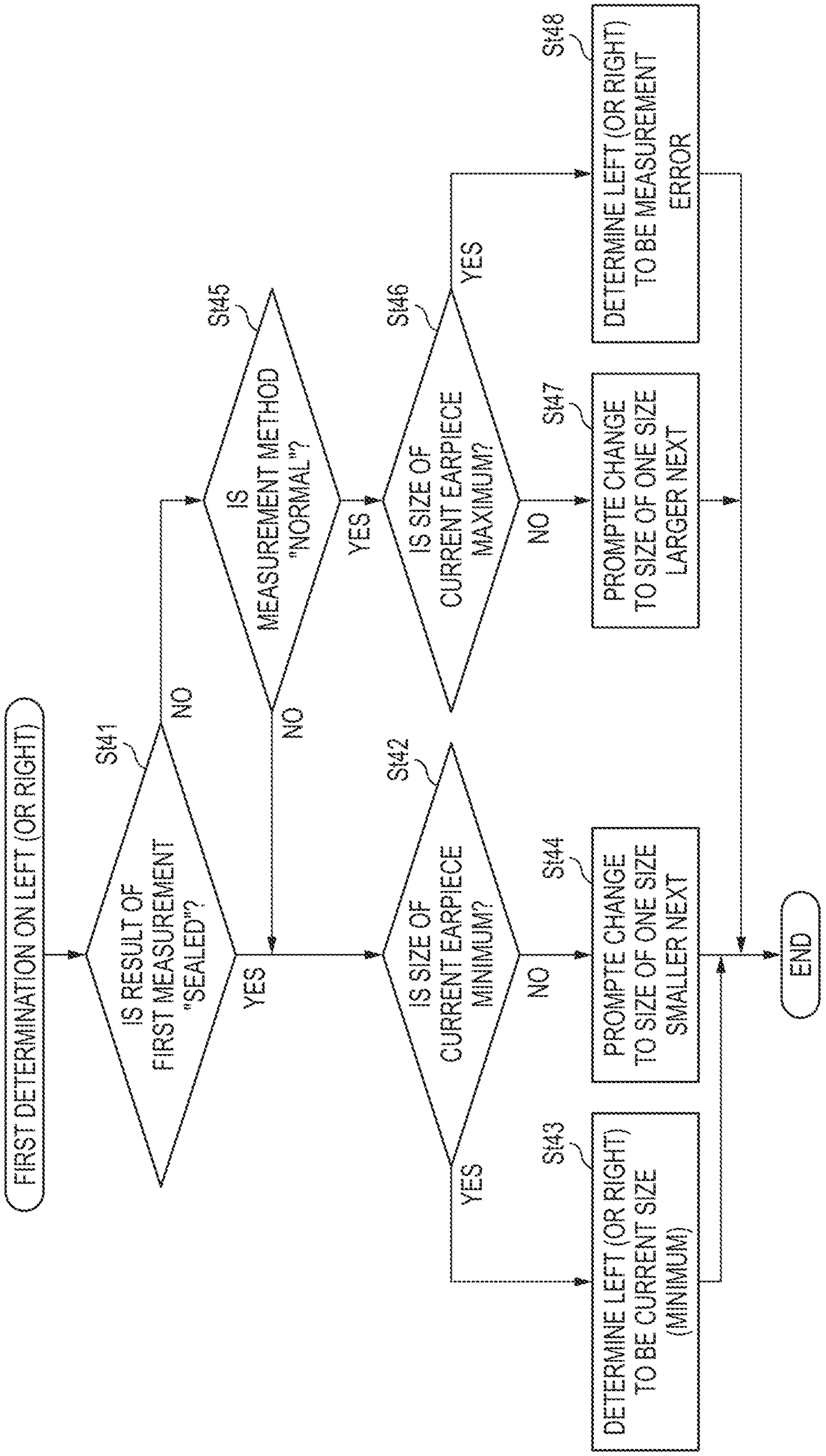
FIG. 11 is a flowchart relating to first determination of a size of an earpiece.

Next, a flowchart relating to first determination of a size of an earpiece will be described with reference to FIG. 11. FIG. 11 is the flowchart relating to the first determination of the size of the earpiece. The flowchart in FIG. 11 is a process executed by the control unit 33. The flowchart in FIG. 11 is a flowchart for determining the earpiece IPL of the left ear or the earpiece IPR of the right ear. Hereinafter, only a case of the earpiece IPL of the left ear will be described, and a case of the earpiece IPR of the right ear will be omitted, but the same can be applied to the case of the earpiece IPR of the right ear by replacing the left ear with the right ear and replacing the earpiece IPL with the earpiece IPR.

The control unit 33 confirms whether a result of the first measurement process is that the earpiece IPL of the left ear seals the ear of the user (St41). In a case where the result of the measurement process is that the earpiece IPL of the left ear seals the ear of the user in the process of step St41 (YES in St41), the control unit 33 determines whether the size of the currently worn earpiece is the minimum (St42).

In a case where it is determined that the size of the currently worn earpiece is the minimum in the process of step St42 (YES in St42), the control unit 33 determines that the size of the currently worn earpiece is the size of the earpiece presumed to be optimum for the ear of the user (St43). A screen for prompting a change of size to the size of the earpiece determined in step St43 is displayed in the process of step St27 in FIG. 9.

In a case where it is determined that the size of the currently worn earpiece is "not minimum" in the process of step St42 (NO in St42), the control unit 33 determines an earpiece of one size smaller than the currently worn earpiece to be a next size to which the user is prompted to change (St44). A screen for prompting a change of size to the size of the earpiece determined in step St44 is displayed in the process of step St20 in FIG. 9.

In a case where the measurement result is that the earpiece IPL of the left ear does not seal the ear of the user in the process of step St41 (NO in St41), the control unit 33 determines whether the measurement method set for the earpiece IPL of the left ear is "normal" (St45).

In a case where it is determined that the measurement method set for the earpiece IPL of the left ear is "normal" (YES in St45), the control unit 33 determines whether the size of the currently worn earpiece is the maximum (St46).

In a case where it is determined that the measurement method set for the earpiece IPL of the left ear is not "normal" (NO in St45), the control unit 33 determines whether the size of the currently worn earpiece is the minimum (St42).

In a case where it is determined that the size of the currently worn earpiece is not the maximum in the process of step St46 (NO in St46), the control unit 33 determines an earpiece of one size larger than the currently worn earpiece to be a next size to which the user is prompted to change (St47). A screen for prompting a change of size to the size of the earpiece determined in step St47 is displayed in the process of step St20 in FIG. 9.

In a case where it is determined that the size of the currently worn earpiece is the maximum in the process of step St46 (YES in St46), the control unit 33 determines that the earpiece presumed to be optimum for the left ear could not be measured (St48). A screen indicating that the earpiece presumed to be optimum for the left ear could not be measured in step St48 is displayed in the process of step St27 in FIG. 9.

Figure 12:
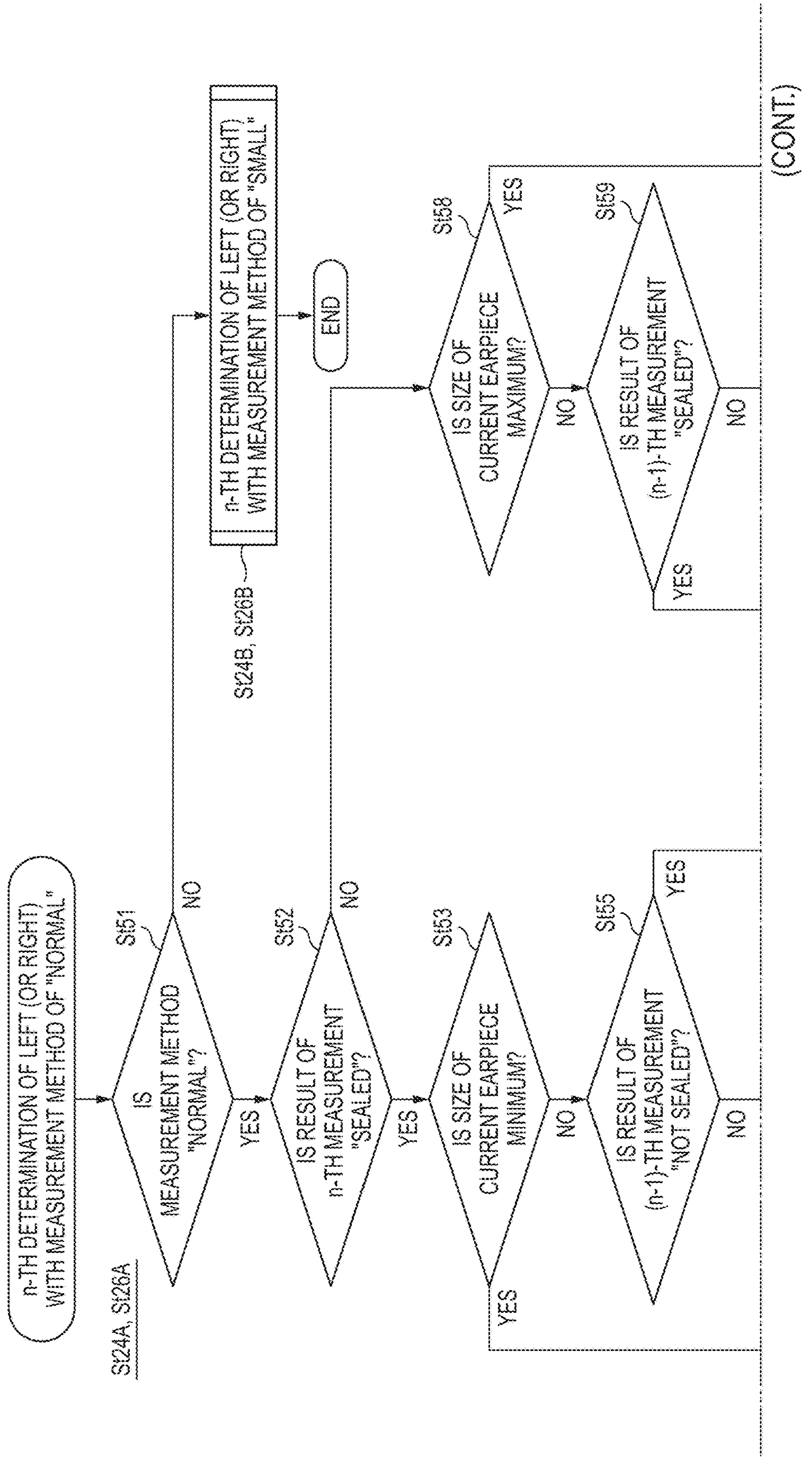
FIG. 12 is a flowchart relating to n-th determination of a size of the earpiece in the measurement method of "normal"

Next, a flowchart relating to the n-th determination of the size of the earpiece will be described with reference to FIG. 12. FIG. 12 is the flowchart relating to the n-th determination of the size of the earpiece. The flowchart in FIG. 12 is a process executed by the control unit 33. The flowchart in FIG. 12 is a flowchart for determining the earpiece IPL of the left ear or the earpiece IPR of the right ear. Hereinafter, only a case of the earpiece IPL of the left ear will be described, and a case of the earpiece IPR of the right ear will be omitted, but the same can be applied to the case of the earpiece IPR of the right ear by replacing the left ear with the right ear and replacing the earpiece IPL with the earpiece IPR.

The control unit 33 determines whether the measurement method set for the earpiece IPL of the left ear is "normal" (St51).

In a case where it is determined that the measurement method set for the earpiece IPL of the left ear is not "normal" (NO in St51), the control unit 33 executes the n-th determination of the earpiece IPL of the left ear when the measurement method is "small" (St24B). The process of step St24B will be described with reference to FIG. 13. In a case where it is determined that a measurement method set for the earpiece IPR of the right ear is not "normal" (NO in St51), the control unit 33 executes the n-th determination of the earpiece IPR of the right ear when the measurement method is "small" (St26B).

In a case where it is determined that the measurement method set for the earpiece IPL of the left ear is "normal" (YES in St51), the control unit 33 confirms whether a result of the n-th measurement process is that the earpiece IPL of the left ear seals the ear of the user (St52). In a case where the result of the measurement process is that the earpiece IPL of the left ear seals the ear of the user in the process of step St52 (YES in St52), the control unit 33 determines whether the size of the currently worn earpiece is the minimum (St53).

In a case where it is determined in the process of step St53 that the size of the currently worn earpiece is the minimum (YES in St53), the control unit 33 determines that the size of the currently worn earpiece is the size of the earpiece presumed to be optimum for the ear of the user (St54). A screen for prompting a change of size to the size of the earpiece determined in step St54 is displayed in the process of step St27 in FIG. 9.

In a case where it is determined in the process of step St53 that the size of the currently worn earpiece is not the minimum (NO in St53), the control unit 33 determines whether a result of the previous measurement, that is, a result of (n−1)-th measurement is that the ear of the user is not sealed by the earpiece IPL of the left ear (St55).

In a case where the measurement result is that the ear of the user is sealed by the earpiece IPL of the left ear in the process of step St55 (NO in St55), the control unit 33 determines an earpiece of one size smaller than the currently worn earpiece to be a next size to which the user is prompted to change (St56). A screen for prompting a change of size to the size of the earpiece determined in step St56 is displayed in the process of step St20 in FIG. 9.

In a case where the measurement result is that the ear of the user is not sealed by the earpiece IPL of the left ear in the process of step St55 (YES in St55), the control unit 33 determines that the size of the currently worn earpiece is the size of the earpiece presumed to be optimum for the ear of the user (St57). A screen for prompting a change of size to the size of the earpiece determined in step St57 is displayed in the process of step St27 in FIG. 9.

In a case where the measurement result is that the earpiece IPL of the left ear does not seal the ear of the user in the process of step St52 (NO in St52), the control unit 33 determines whether the size of the currently worn earpiece is the maximum (St58).

In a case where it is determined that the size of the currently worn earpiece is not the maximum in the process of step St58 (NO in St58), the control unit 33 confirms whether a result of the previous measurement, that is, a result of (n−1)-th measurement is that the ear of the user is sealed by the earpiece of the left ear (St59).

In a case where the measurement result is that the ear of the user is sealed by the earpiece of the left ear in the process of step St59 (YES in St59), the control unit 33 determines that an earpiece having a larger size next to the size of the earpiece currently worn by the user is an earpiece presumed to be optimum for the ear of the user (St60). A screen for prompting a change of size to the size of the earpiece determined in step St60 is displayed in the process of step St27 in FIG. 9.

In a case where the measurement result is that the ear of the user is not sealed by the earpiece IPL of the left ear in the process of step St59 (NO in St59), the control unit 33 determines an earpiece of one size larger than the currently worn earpiece to be a next size to which the user is prompted to change (St61). A screen for prompting a change of size to the size of the earpiece determined in step St61 is displayed in the process of step St20 in FIG. 9.

In a case where it is determined that the size of the currently worn earpiece is the maximum in the process of step St58 (YES in St58), the control unit 33 determines that the earpiece presumed to be optimum for the left ear could not be measured (St62). A screen indicating that the earpiece presumed to be optimum for the left ear could not be measured in step St62 is displayed in the process of step St27 in FIG. 9.

Figure 13:
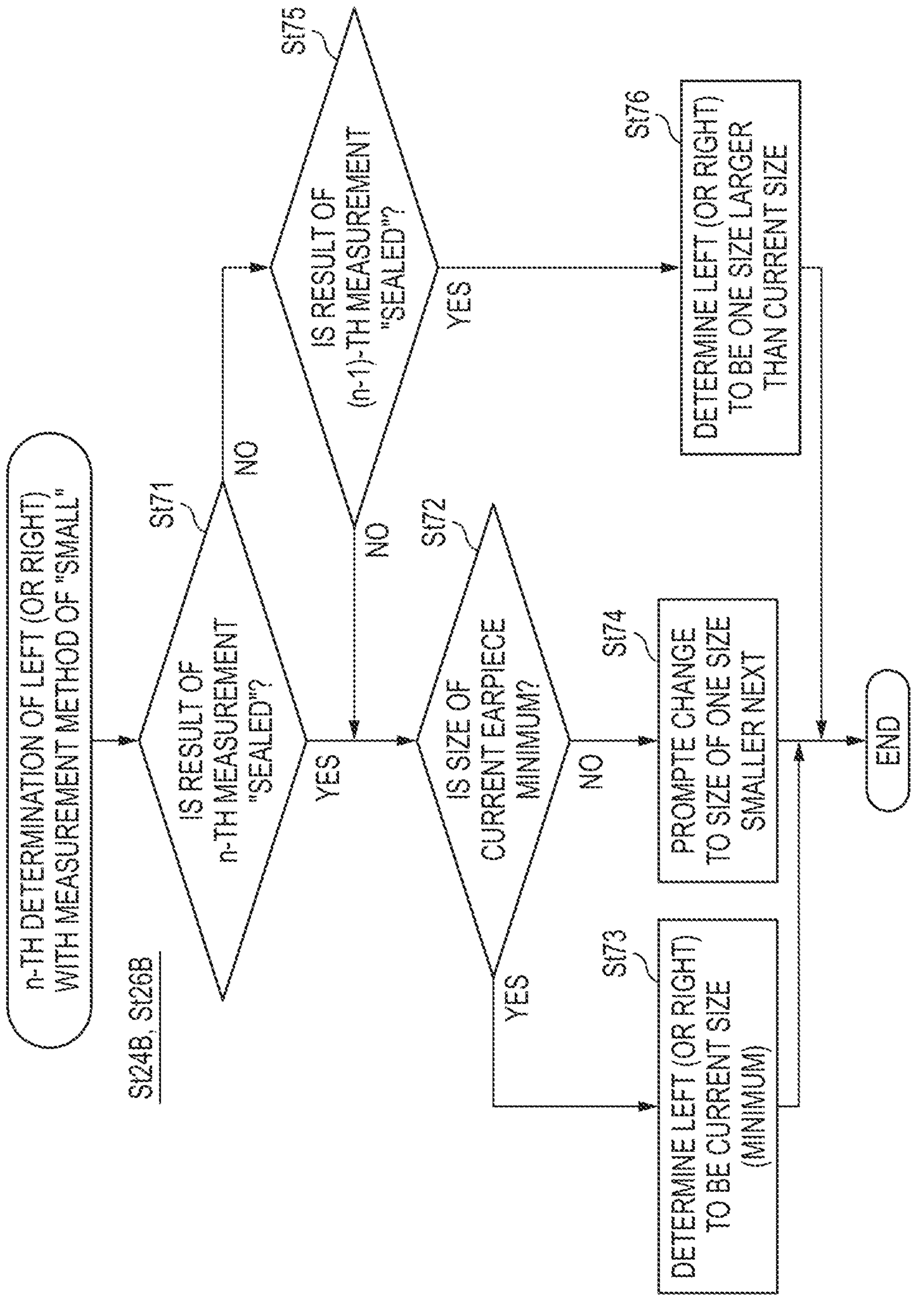
FIG. 13 is a flowchart relating to n-th determination of a size of the earpiece in the measurement method of "small".

Next, a flowchart relating to the n-th determination of the size of the earpiece will be described with reference to FIG. 13. FIG. 13 is a flowchart relating to n-th determination of the size of the earpiece in the measurement method of "small". The flowchart in FIG. 13 is a process executed by the control unit 33. The flowchart in FIG. 13 is a flowchart for determining the earpiece IPL of the left ear or the earpiece IPR of the right ear. Hereinafter, only a case of the earpiece IPL of the left ear will be described, and a case of the earpiece IPR of the right ear will be omitted, but the same can be applied to the case of the earpiece IPR of the right ear by replacing the left ear with the right ear and replacing the earpiece IPL with the earpiece IPR.

The control unit 33 confirms whether a result of the n-th measurement process is that the earpiece IPL of the left ear seals the ear of the user (St71). In a case where the result of the n-th measurement process is that the earpiece IPL of the left ear seals the ear of the user in the process of step St71 (YES in St71), the control unit 33 confirms whether the size of the currently worn earpiece is the minimum (St72).

In a case where it is determined that the size of the currently worn earpiece is the minimum in the process of step St72 (YES in St72), the control unit 33 determines that the size of the currently worn earpiece is the size of the earpiece presumed to be optimum for the ear of the user (St73). A screen for prompting a change of size to the size of the earpiece determined in step St73 is displayed in the process of step St27 in FIG. 9.

In a case where it is determined that the size of the currently worn earpiece is not the minimum in the process of step St72 (NO in St72), the control unit 33 determines an earpiece of one size smaller than the currently worn earpiece to be a next size to which the user is prompted to change (St74). A screen for prompting a change of size to the size of the earpiece determined in step St74 is displayed in the process of step St20 in FIG. 9.

In a case where the result of the n-th measurement process is that the earpiece IPL of the left ear does not seal the ear of the user in the process of step St71 (NO in St71), the control unit 33 confirms whether a result of an (n−1)-th measurement process is that the earpiece IPL of the left ear seals the ear of the user (St75).

In a case where the result of the (n−1)-th measurement process is that the earpiece IPL of the left ear seals the ear of the user in the process of step St75 (YES in St75), the control unit 33 determines that an earpiece having a larger size next to the size of the earpiece currently worn by the user is the earpiece presumed to be optimum for the ear of the user (St76). A screen for prompting a change of size to the size of the earpiece determined in step St76 is displayed in the process of step St27 in FIG. 9.

In a case where the measurement result is that the earpiece IPL of the left ear does not seal the ear of the user in the process of step St75 (NO in St75), the control unit 33 confirms whether the size of the currently worn earpiece is the minimum (St72).

As described above, in a case where the sound signal transmitted from the smartphone F1 or the sound signal output from the earphone 1 is output from speakers SP1L and SP1R, the earphone 1 picks up the sound from the microphones MC3L and MC3R. The measurement system 100 executes the measurement process at least once on whether the currently worn earpiece is sealed in the left ear or the right ear of the user based on the picked-up sound signal. The smartphone F1 includes the display and operation unit 30, and displays, on the display and operation unit 30, a notification indicating that the size of the currently worn earpiece worn by the user is a most suitable size among the sizes of the plurality of earpieces, or a notification for prompting replacement with another earpiece having a size larger or smaller than the size of the currently worn earpiece, based on the result of the measurement process.

As described above, the measurement system 100 includes the two earphones 1L and 1R which are respectively worn in the left ear and the right ear of the user and in which a plurality of earpieces having different sizes are replaceably attached on one end side of each, and the smartphone F1 which is carried by the user. The earphones 1L and 1R include the speakers SP1L and SP1R and the microphones MC3L and MC3R, and pick up sounds by the microphones MC3L and MC3R in a case where the currently worn earpiece, which is any earpiece of the plurality of earpieces, is worn in the left ear or the right ear of the user and the sound signal transmitted from the smartphone F1 or the sound signal output from the earphone 1 is output from the speakers SP1L and SP1R. The measurement system 100 executes the measurement process at least once on whether the currently worn earpiece is sealed in the left ear or the right ear of the user based on the picked-up sound signal. The smartphone F1 includes the display and operation unit 30, receives an input operation related to the wearing feeling of the currently worn earpiece worn in the left ear or the right ear of the user, and displays, on the display and operation unit 30, a notification indicating that the size of the currently worn earpiece worn by the user is a most suitable size among the sizes of the plurality of earpieces, or a notification for prompting replacement with another earpiece having a size larger or smaller than the size of the currently worn earpiece, based on the input operation related to the wearing feeling and the measurement result by the measurement process.

Accordingly, the measurement system 100 can efficiently specify an earpiece having a size presumed to be optimum for an own ear of a user, and improve convenience for the user at the time of selecting the earpiece.

In addition, in a case where the measurement result is a measurement result indicating that the currently worn earpiece is not sealed in the left ear or the right ear of the user among measurement results of the measurement process repeatedly executed by the measurement system 100, the smartphone F1 determines a size of another earpiece to be worn next with respect to the currently worn earpiece based on the input operation related to the wearing feeling, and displays a notification for prompting replacement with the determined size of the other earpiece on the display and operation unit 30. Accordingly, the user can minimize replacement of earpieces until the user finds the earpiece presumed to be optimum for the ear of the user from the currently worn earpiece at the start of the determination, and can find the earpiece having a size more suitable for the user even when the user has a small ear hole.

In addition, the smartphone F1 displays, on the display and operation unit 30, a notification for prompting replacement with another earpiece having a smaller size next to the size of the currently worn earpiece based on an input operation indicating that the size of the currently worn earpiece is large according to the input operation related to the wearing feeling. Accordingly, the user can minimize the replacement of the earpieces until the user finds the earpiece presumed to be optimum for the ear of the user from the currently worn earpiece at the start of the determination.

In addition, the smartphone F1 displays, on the display and operation unit 30, a notification for prompting replacement with an earpiece having a smallest size among earpieces for which a measurement result indicating that the currently worn earpiece is sealed in the left ear or right ear of the user is obtained, based on the measurement result by the measurement process repeatedly executed by the measurement system 100. Accordingly, the user can minimize replacement of earpieces until the user finds the earpiece presumed to be optimum for the ear of the user from the currently worn earpiece at the start of the determination, and can find the earpiece having a size more suitable for the user even when the user has a small ear hole.

In addition, the smartphone F1 displays, on the display and operation unit 30, a notification for prompting replacement with another earpiece having a larger size next to the size of the currently worn earpiece corresponding to a measurement result indicating that the currently worn earpiece is not sealed in the left ear or the right ear of the user among measurement results of the measurement process repeatedly executed by the measurement system 100, based on the measurement result and an input operation indicating that the size of the currently worn earpiece is not large according to the input operation related to the wearing feeling. Accordingly, the user can minimize the replacement of the earpieces until the user finds the earpiece presumed to be optimum for the ear of the user from the currently worn earpiece at the start of the determination.

In addition, the smartphone F1 displays, on the display and operation unit 30, a notification for prompting replacement with the other earpiece having a smaller size next to the size of the currently worn earpiece corresponding to a measurement result indicating that the currently worn earpiece is sealed in the left ear or the right ear of the user among measurement results of the measurement process repeatedly executed by the measurement system 100, based on the measurement result and an input operation indicating that the size of the currently worn earpiece is not large according to the input operation related to the wearing feeling. Accordingly, the user can minimize the replacement of the earpieces until the user finds the earpiece presumed to be optimum for the ear of the user from the currently worn earpiece at the start of the determination.

The smartphone F1 displays a screen indicating that measurement is currently being executed on the display and operation unit 30. Accordingly, the user can visually confirm that the measurement process is currently being executed.

When the earphones 1L and 1R execute the measurement process, and the currently worn earpiece is not of the most suitable size among the sizes of the plurality of earpiece, the smartphone F1 displays, on the display and operation unit 30, a screen including at least the following: images or schematic diagrams of the earphones 1L and 1R of the respective left ear and right ear, sizes of earpieces to be measured next with respect to the earpieces currently worn in the respective left ear and right ear, and a text for prompting replacement with the earpieces of the sizes. Accordingly, the smartphone F1 can support the user to replace the earpiece by displaying an easy-to-understand screen on the display and operation unit 30 when the user replaces the earpiece.

In addition, when the earphones 1L and 1R execute the measurement process, and the currently worn earpiece is of the most suitable size among the sizes of the plurality of earpiece, the smartphone F1 displays, on the display and operation unit 30, a screen including at least the following: an image or a schematic diagram of the earphone of each of the left ear and the right ear, and the size of the earpiece presumed to be optimum for the ear of the user based on the result of the measurement process. Accordingly, the user can visually confirm the earpiece having a size most suitable for the user.

The smartphone F1 outputs an instruction for prompting the user to input the sizes of the earpieces attached on the earphones 1L and 1R before the first measurement process. Accordingly, since the measurement can be started from the currently worn earpiece, the user can efficiently specify an earpiece having a size presumed to be optimum for an own ear of a user, and improve convenience for the user at the time of selecting the earpiece.

The smartphone F1 includes, as one of options of the input, an option indicating a state that the earpieces attached on the earphones 1L and 1R in advance at the time of purchase of the product is not replaced in a case where the instruction for prompting the user to input the sizes of the earpieces attached on the earphones 1L and 1R before the first measurement process is output. Accordingly, even when the user does not know the sizes of the earpieces attached on the earphones 1L and 1R in advance, the user can input the size of the currently worn earpiece before the first measurement process. Accordingly, the measurement system 100 can support the user to easily start the measurement process.

Although the embodiment has been described above with reference to the accompanying drawings, the present disclosure is not limited to such an embodiment. It is apparent to those skilled in the art that various modifications, substitutions, addition, deletions, and equivalents can be conceived within the scope described in the claims, and it is understood that the scope of the present disclosure includes these modifications. In addition, constituent elements in the embodiment described above may be freely combined without departing from the gist of the invention.

INDUSTRIAL APPLICABILITY

The technique of the present disclosure is useful for providing a measurement system and a measurement method of efficiently specifying an earpiece of a size presumed to be optimum for an own ear of a user and improving convenience for the user at the time of selecting the earpiece.

What is claimed is:

1. A measurement system comprising:

two earphones which are respectively worn in a left ear and a right ear of a user and in which a plurality of earpieces having different sizes are replaceably attached on one end side of each earphones, and a wireless terminal carried by the user, wherein the earphone includes a speaker and a microphone, and picks up a sound by the microphone in a case where a currently worn earpiece, which is any of the plurality of earpieces, is worn in the left ear or the right ear of the user and a sound signal transmitted from the wireless terminal or a sound signal output from the earphone is output from the speaker, the measurement system executes a measurement process at least once on whether the currently worn earpiece is sealed in the left ear or the right ear of the user based on the picked-up sound signal, and the wireless terminal includes a display unit, receives an input operation related to a wearing feeling of the currently worn earpiece worn in the left ear or the right ear of the user, and displays, on the display unit, a notification indicating that a size of the currently worn earpiece worn by the user is a most suitable size among the sizes of the plurality of earpieces, or a notification for prompting replacement with another earpiece having a size larger or smaller than the size of the currently worn earpiece, based on the input operation related to the wearing feeling and a measurement result by the measurement process.

2. The measurement system according to claim 1, wherein in a case of a measurement result indicating that the currently worn earpiece is not sealed in the left ear or the right ear of the user among measurement results of the measurement process repeatedly executed by the measurement system, the wireless terminal determines a size of the other earpiece to be worn next to the currently worn earpiece and displays a notification for prompting replacement with the determined size of the other earpiece on the display unit, based on the input operation related to the wearing feeling.

3. The measurement system according to claim 2, wherein the wireless terminal displays, on the display unit, a notification for prompting replacement with the other earpiece having a smaller size next to the size of the currently worn earpiece based on an input operation indicating that the size of the currently worn earpiece is large according to the input operation related to the wearing feeling.

4. The measurement system according to claim 3, wherein the wireless terminal displays, on the display unit, a notification for prompting replacement with an earpiece having a smallest size among earpieces for which a measurement result indicating that the currently worn earpiece is sealed in the left ear or right ear of the user is obtained, based on the measurement result by the measurement process repeatedly executed by the measurement system.

5. The measurement system according to claim 1, wherein the wireless terminal displays, on the display unit, a notification for prompting replacement with the other earpiece having a larger size next to the size of the currently worn earpiece corresponding to a measurement result indicating that the currently worn earpiece is not sealed in the left ear or the right ear of the user among measurement results of the measurement process repeatedly executed by the measurement system, based on the measurement result and an input operation indicating that the size of the currently worn earpiece is not large according to the input operation related to the wearing feeling.

6. The measurement system according to claim 1, wherein the wireless terminal displays, on the display unit, a notification for prompting replacement with the other earpiece having a smaller size next to the size of the currently worn earpiece corresponding to a measurement result indicating that the currently worn earpiece is sealed in the left ear or the right ear of the user among measurement results of the measurement process repeatedly executed by the measurement system, based on the measurement result and an input operation indicating that the size of the currently worn earpiece is not large according to the input operation related to the wearing feeling.

7. The measurement system according to claim 1, wherein the wireless terminal displays a screen indicating that measurement is currently being executed on the display unit.

8. The measurement system according to claim 1, wherein the wireless terminal displays, on the display unit, a screen including at least the following: an image or a schematic diagram of the earphone of each of the left ear and the right ear, a size of earpiece to be measured next with respect to the earpiece currently worn in each of the left ear and the right ear, and a text for prompting replacement with the earpiece of the size.

9. The measurement system according to claim 1, wherein
the wireless terminal displays, on the display unit, a screen including at least the following: an image or a schematic diagram of the earphone of each of the left ear and the right ear, and a size of an earpiece presumed to be optimum for the ear of the user based on a result of the measurement process.

10. The measurement system according to claim 1, wherein
the wireless terminal outputs an instruction for prompting the user to input the size of the earpiece attached on the earphone before a first measurement process.

11. The measurement system according to claim 10, wherein
the wireless terminal includes, as one of options of the input, an option indicating a state that an earpiece attached on the earphone in advance at the time of purchase of the earphone is not replaced in the case where the instruction for prompting the user to input the size of the earpiece attached on the earphone before the first measurement process is output.

12. A measurement method of controlling two earphones which are respectively worn in a left ear and a right ear of a user and in which a plurality of earpieces having different sizes are replaceably attached on one end side of each earphones, and a wireless terminal carried by the user, the measurement method comprising:
picking up a sound by a microphone provided in the earphone in a case where a currently worn earpiece, which is any of the plurality of earpieces, is worn in the left ear or the right ear of the user and a sound signal transmitted from the wireless terminal or a sound signal output from the earphone is output from a speaker provided in the earphone,
executing a measurement process at least once on whether the currently worn earpiece is sealed in the left ear or the right ear of the user based on the picked-up sound signal, and
receiving an input operation related to a wearing feeling of the currently worn earpiece worn in the left ear or the right ear of the user, and displaying, on a display unit provided in the wireless terminal, a notification indicating that a size of the currently worn earpiece worn by the user is a most suitable size among the sizes of the plurality of earpieces, or a notification for prompting replacement with another earpiece having a size larger or smaller than the size of the currently worn earpiece, based on the input operation related to the wearing feeling and a measurement result by the measurement process.

* * * * *